US012688541B2

(12) United States Patent
Black

(10) Patent No.: US 12,688,541 B2
(45) Date of Patent: Jul. 21, 2026

(54) SYSTEM AND METHOD FOR LIVE SPORTS BETTING

(71) Applicant: Shane Black, Stafford, VA (US)

(72) Inventor: Shane Black, Stafford, VA (US)

( * ) Notice: Subject to any disclaimer, the term of this patent is extended or adjusted under 35 U.S.C. 154(b) by 0 days.

(21) Appl. No.: 17/714,557

(22) Filed: Apr. 6, 2022

(65) Prior Publication Data

US 2022/0335559 A1 Oct. 20, 2022

Related U.S. Application Data

(60) Provisional application No. 63/301,839, filed on Jan. 21, 2022, provisional application No. 63/171,999, filed on Apr. 7, 2021.

(51) Int. Cl.
*G06Q 50/34* (2012.01)
*G07F 17/32* (2006.01)

(52) U.S. Cl.
CPC ......... *G06Q 50/34* (2013.01); *G07F 17/3227* (2013.01); *G07F 17/3237* (2013.01); *G07F 17/3288* (2013.01)

(58) Field of Classification Search
CPC .. G07F 17/3288; G07F 17/3227; G06Q 50/34
See application file for complete search history.

(56) References Cited

U.S. PATENT DOCUMENTS

| | | | | |
|---|---|---|---|---|
| 7,774,259 B1 * | 8/2010 | Satterfield | G07F 17/3288 | 463/40 |
| 2001/0049289 A1 * | 12/2001 | Kim | H04W 88/02 | 455/566 |
| 2002/0073021 A1 * | 6/2002 | Ginsberg | A63F 3/081 | 705/38 |
| 2007/0060305 A1 * | 3/2007 | Amaitis | G07F 17/32 | 463/25 |
| 2011/0281620 A1 * | 11/2011 | Hays | G07F 17/3288 | 463/2 |
| 2012/0214575 A1 * | 8/2012 | Amaitis | G06Q 50/34 | 463/25 |
| 2017/0017657 A1 * | 1/2017 | English | G07F 17/3211 | |
| 2017/0092060 A1 * | 3/2017 | Toohey | G06F 16/254 | |
| 2018/0276602 A1 * | 9/2018 | Rivalto | G06Q 20/308 | |
| 2020/0005593 A1 * | 1/2020 | McDowell | H04L 63/1433 | |
| 2021/0118264 A1 * | 4/2021 | Nelson | G07F 17/3288 | |

* cited by examiner

*Primary Examiner* — Yingchuan Zhang
(74) *Attorney, Agent, or Firm* — Olivo IP Law Group P.C.; John W. Olivo, Jr.

(57) ABSTRACT

A system and method to allow a user to take advantage of live sports betting lines in the gambling industry, optionally using an artificial intelligence feature along with a series of alerts enabling better management of bets even while a bettor is not actively monitoring and controlling bets. An automated set target system for live betting wherein a user sets a limit and if the conditions are met during the specified timeframe, a buy is triggered By setting automated target conditions, the user's bet is triggered automatically if those conditions are met at any point during the selected timeframe. Additionally, a user may be alerted when conditions are met, and a user may take advantage of live lines before and during a game, as opposed to tracking live lines until the user's preferred criteria is matched to bet.

18 Claims, 35 Drawing Sheets

FOOTBALL - PRE-GAME

500

| | SPREAD | WIN | TOTAL |
|---|---|---|---|
| TEAM 1 | +6 (-110) | +160 | O 44.5 (-110) |
| TEAM 2 | -6 (-110) | -220 | U 44.5 (-110) |

502

Time Frame Dropdown:
- 1st Quarter
- Halftime
- 3rd Quarter
- Full Game

Figure 5

FOOTBALL - IN-GAME

| | SPREAD | WIN | TOTAL |
|---|---|---|---|
| TEAM 1 | +3 (-110) | +120 | O 48.5 (-110) |
| TEAM 2 | -3 (-110) | -150 | U 48.5 (-110) |

Time Frame Dropdown:

- 1st Quarter
- Halftime
- 3rd Quarter
- Full Game

Figure 7

FOOTBALL - IN-GAME TARGET BET

| | |
|---|---|
| TEAM 2<br>MONEYLINE | -110 ≥ |
| RISK 110 | WIN 100 |

Time Frame: Full Game

Figure 8

Figure 18J
LINEHAWK
GAMING
$120.00
DEPOSIT
PROMOTIONS
View All (18)
Live
Watchlist
Boosts
NFL
NCAAF
LIVE
UPCOMING
Tag View
OFF
NFL
View More
SPREAD
M/L
TOTAL
DAL Cowboys
+3 -110
+120
O 48.5 -110
NY Giants
-3 -110
-150
U 48.5 -110
PARLAY
More Bets
SPREAD
M/L
TOTAL
LA Rams
-4 -110
-170
O 47.5 -110
SEA Seahawks
+4 -110
+140
U 47.5 -110
PARLAY
More Bets
HALFTIME
SPREAD
M/L
TOTAL
PHI Eagles
+3 -110
+125
O 43.5 -110
WAS Football
-3 -110
-150
U 43.5 -110
PARLAY
More Bets
All Sports
My Bets
Live
Watchlist

Figure 18M
LINEHAWK
GAMING
$120.00
DEPOSIT
PROMOTIONS
View All (18)
Live
Watchlist
Boosts
NFL
NCAAF
LIVE
UPCOMING
Tag View
ON
NFL
View More
SPREAD
M/L
TOTAL
DAL Cowboys
NY Giants
PARLAY
More Bets
LA Rams
SEA Seahawks
PHI Eagles
WAS Football
All Sports
My Bets
Live
Watchlist

Figure 18N
LINEHAWK GAMING
$120.00
DEPOSIT
PROMOTIONS
View All (18)
Live
Watchlist
Boosts
NFL
NCAAF
LIVE
UPCOMING
Tag View
ON
NFL
View More
SPREAD
M/L
TOTAL
DAL Cowboys
NY Giants
PARLAY
More Bets
LA Rams
SEA Seahawks
PARLAY
More Bets
PHI Eagles
WAS Football
PARLAY
More Bets
All Sports
My Bets
Live
Watchlist

SYSTEM AND METHOD FOR LIVE SPORTS BETTING

PRIORITY CLAIMS

This application claims the benefit of U.S. Provisional Application Ser. No. 63/171,999, filed Apr. 7, 2021, and U.S. Provisional Application Ser. No. 63/301,839, filed Jan. 21, 2022, the contents of which are incorporated herein.

FIELD OF THE INVENTION

This invention relates to a system and method for alerting and enabling users to use limit, criteria betting lines to wager on live sporting events.

BACKGROUND OF THE INVENTION

Placing bets on the outcome of live sporting events is an integral part of the gambling industry. Sports betting is the activity of predicting sports results and placing a wager on the outcome. Spread betting is any of various types of wagering on the outcome of an event where the pay-off is based on the accuracy of the wager, rather than a simple "win or lose" outcome, such as fixed-odds betting or pari-mutuel betting. A spread is a range of outcomes and the bet is whether the outcome will be above or below the spread. Odds for different outcomes in single bet are the ratio of the full payout to the stake. In the US, odds are the amount won on a 100 stake when positive and the stake needed to win 100 when negative, and odds of 100 are an even bet.

Many companies offer users multiple ways to bet on the outcome of a sporting event, such as football, before the start of the event. For example, a betting agent may publish odds for betting on the various possible winners, and users may place bets that a particular player or team will win. Betting on the spread is effectively a fixed risk bet on a line offered by the bookmaker with a known return if the gambler correctly bets with either the underdog or the favorite on the line offered and a known loss if the gambler incorrectly bets on the line.

Currently, in order to live bet, a user must focus in on one or two particular games and try to place bets with lines updating by the second. If you are not able to place the bet in time before the line or odds on the bet change, you are not able to make the bet, and must wait until a new line, with new odds, is generated. This can lead to tracking live lines all throughout the game, resulting in a less than ideal user experience.

An additional problem with live sports betting is that the user may not be able to devote the necessary time or attention to take advantage of live lines. For example, if the user is at a social function such as a birthday or a wedding or for any reason where they are not able to access their mobile device when necessary, making it impossible to take advantage of live lines.

SUMMARY OF THE INVENTION

The present invention is a solution to enable the user to take advantage of live sports betting lines in the gambling industry. The present invention provides a unique way of placing sports bets based off of a limit criteria, either before the game or live during the game. The limit betting concept is coupled with a live, taggable watchlist screen of betting lines that the user wants to follow allows for greater ease and accessibility, improving on the overall user experience. In addition, the present invention can alert the user when the user's bet criteria is met as well, versus just triggering the bet.

In one embodiment, the present invention provides an automated set target approach to live line betting. The user sets a limit and if the conditions are met, the buy is triggered. This automated approach is combined with the margin (also known as the "juice") as well as a timeframe aspect. A betting line is a form of wagering whereby the bookmaker or sportsbook set gambling odds and determine the favorite and underdog teams in a match. This handicap creates a margin (or "line") between the two teams, where there are only two outcomes possible, and sets the parameters for wagering on the game.

For example, the betting line is set for Team A −6 at −110 odds (bet $110 to win $100) vs. Team B. The user thinks Team A could cover this number but would feel more comfortable with a line around Team A −3. Instead of buying a large amount of points or having to track this throughout the duration of game, the user would simply create the following scenario: Team A −3 at −110 odds or better (+100 odds, +110 odds, etc.) for $100. The user would also be able to select a timeframe for the bet, which would further allow the user to have an advantageous, automated advantage. If these conditions are met at any point during the specified timeframe the user selects, the user's bet is triggered. If they are not, this simply turns into a no bet. This can apply to spreads, over/under, and player prop bets, etc. This results in a more user-friendly software solution, allowing the user to take advantage of bets they like in volume on the live lines, and across multiple sports that are going on simultaneously. With this automated set target approach, this software would allow users to take advantage of live lines before and during the game, thereby eliminating the very time-consuming task of tracking live lines until the user's preferred criteria is matched to bet.

The set it and forget it target approach of the present invention's software would provide users an advantageous way to set criteria for possible lines that may appear on the live lines. Being able to set advantageous target betting lines, across multiple sports, or even the same sport when there are a lot of games on simultaneously (I.e., NFL Sunday, College Football Saturday's, etc.) is an option that is not currently available. This way of placing bets solves a huge customer pain point that has not been addressed to date. With live sports betting continuing to rise month over month compared to the traditional betting on set lines before the game, this user-friendly approach will eliminate the time consuming and frustrating task of tracking live lines while allowing users the ability to capitalize on more bets they like live.

The present invention will focus on the bettor's behaviors and will give ratings on every bet based on these behaviors. Other betting applications offer ratings, but these are subjective, based on many different factors or affected by outside factors, like media. With the bettor specific, not subjective, ratings, this invention gives the bettor a better opportunity at success. This invention tells the bettor how they perform and what types of bets the bettor is most successful in. This is an advantageous benefit that gives the bettor a fighting chance when placing bets.

Payment wallets for managing investments and serving as a recommendation system are well known in the art and may be applied for gaming or betting solutions herein. A content recommendation system includes at least one processor and a memory coupled to the at least one processor. The memory stores a plurality of content item identifiers corresponding to a plurality of stored content items, a viewing history index including, for each user of a plurality of users and a viewing history indicating content items the user has viewed. The memory also stores a content similarity index including a similarity score indicating a similarity between content items of the plurality of stored content items and a user similarity index identifying, for each user of the plurality of users, a set of similar users. The memory also stores instructions that, upon execution, cause the at least one processor to obtain a first viewing history of a first user from the viewing history index and determine, based on the user similarity index, a first set of users similar to the first user.

The instructions further cause the processor to obtain a corresponding viewing history from the viewing history index for each user in the first set of users and select a set of similar content item identifiers from the plurality of content item identifiers based on similarity scores stored in the content similarity index between the content items in the first viewing history and the plurality of stored content items. The instructions also cause the processor to update a first recommendation list with (i) the corresponding viewing history from the viewing history index for each similar user in the first set of users and (ii) the set of similar content item identifiers. The instructions further cause the processor to select a subset of recommended content item identifiers from the first recommendation list based on a weighted similarity score and transmit each identifier included in the subset of recommended content item identifiers to a user device of the first user for display of a corresponding user-selectable link for each identifier on a screen of the user device.

The memory stores, for each content item of the plurality of stored content items, a profile. In other features, the instructions, upon execution, cause the at least one processor to, in response to a new content item, generate a first profile for the new content item, calculate a corresponding similarity score between the new content item and the plurality of stored content items, and add the corresponding similarity scores to the content similarity index. In other features, the first profile for the new content item is based on a predetermined list of terms. In other features, the instructions, upon execution, cause the at least one processor to classify the first user into a first group of a set of groups based on first user parameters and select a predetermined number of members of the first group as the set of similar users.

The instructions, upon execution, cause the at least one processor to determine a distance value for each member of the first group indicating how similar the first user is to each member of the first group. In other features, the instructions, upon execution, cause the at least one processor to select the predetermined number of members of the first group as the set of similar users based on a respective distance value for each of the selected predetermined number of members.

The user similarity index for the first user is updated in response to: a predetermined interval having elapsed; and, a change to a first profile corresponding to the first user. In other features, the memory stores a user parameter database including, for each user, user parameters including: portfolio structure; trading activity; platform usage; and demographic information. The selected set of similar content item identifiers have similarity scores above a predetermined threshold.

The weighted similarity score for content items in the subset of recommended content item identifiers indicates how similar the content items are to at least one of: the content items of the first viewing history; and, content items of the corresponding viewing history of a similar user in the first set of users. In other features, the instructions, upon execution, cause the at least one processor to determine the weighted similarity score for each entry of the first recommendation list based on the first viewing history and select a predetermined number of content items from the first recommendation list based on the weighted similarity score as the subset of recommended content item identifiers.

The instructions, upon execution, cause the at least one processor to identify entries common to the first viewing history of the first user and the first recommendation list and remove the identified entries prior to selecting the subset of recommended content item identifiers. In other features, the instructions, upon execution, cause the at least one processor to obtain a respective recommendation list for each similar user in the first set of users and update the first recommendation list with each obtained respective recommendation list. In other features, the plurality of stored content items include at least one of: a video; an article; a playlist; and, an online course.

A content recommendation method includes obtaining a first viewing history of a first user from a viewing history index. The viewing history index includes, for each user of a plurality of users, a viewing history indicating content items the user has viewed. The method further includes determining, based on a user similarity index, a first set of users similar to the first user. The user similarity index identifies, for each user of the plurality of users, a set of similar users. The method also includes obtaining a corresponding viewing history from the viewing history index for each user in the first set of users.

The method further includes selecting a set of similar content item identifiers from a plurality of content item identifiers based on similarity scores stored in a content similarity index between the content items in the first viewing history and the plurality of stored content items. The content similarity index includes a similarity score indicating a similarity between content items of the plurality of stored content items. The plurality of content item identifiers correspond to a plurality of stored content items. The method also includes updating a first recommendation list with: the corresponding viewing history from the viewing history index for each similar user in the first set of users; and, the set of similar content item identifiers. The method further includes selecting a subset of recommended content item identifiers from the first recommendation list based on a weighted similarity score. The method also includes transmitting each identifier included in the subset of recommended content item identifiers to a user device of the first user for display of a corresponding user-selectable link for each identifier on a screen of the user device.

The method includes generating a first profile for the new content item. For each content item of the plurality of stored content items, a profile is stored. In other features, the method includes calculating, based on a predetermined list of terms, a corresponding similarity score between the new content item and the plurality of stored content items and adding the corresponding similarity scores to the content similarity index. In other features, the method includes classifying the first user into a first group of a set of groups based on first user parameters and selecting a predetermined number of members of the first group as the set of similar users.

The method includes determining a distance value for each member of the first group indicating how similar the first user is to each member of the first group. In other features, the method includes selecting the predetermined number of members of the first group as the set of similar users based on a respective distance value for each of the selected predetermined number of members. In other features, the method includes determining the weighted similarity score for each entry of the first recommendation list based on the first viewing history and selecting a predetermined number of content items from the first recommendation list based on the weighted similarity score as the subset of recommended content item identifiers.

The method includes identifying entries common to the first viewing history of the first user and the first recommendation list and removing the identified entries prior to selecting the subset of recommended content item identifiers. In other features, the method includes obtaining a respective recommendation list for each similar user in the first set of users and updating the first recommendation list with each obtained respective recommendation list.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein:

FIG. 5 is an example of the pre-game component of the present invention.

FIG. 7 is an example of the in-game component of the present invention.

FIG. 8 is an example of the in-game target bet component of the present invention.

DETAILED DESCRIPTION OF THE PREFERRED EMBODIMENT

This present invention is a solution to enable the user to take advantage of live sports betting lines in the gambling industry, optionally using an artificial intelligence feature along with a series of alerts enabling bettor management of bets even while a better is not actively monitoring and controlling bets. This is achieved through an automated set target approach to live betting. The user sets a limit and if the conditions are met during the specified timeframe, the buy is triggered. This automated approach is combined with the margin. By setting automated target conditions, the user's bet is triggered automatically if those conditions are met at any point during the game. There is also an option of just being alerted when conditions are met, versus automatically triggering the bet. The present invention is a user-friendly software solution that allows the user to take advantage of bets they like in volume on the live lines. With this automated set target approach, this software would allow users to take advantage of live lines before and during the game, thereby eliminating the very time-consuming task of tracking live lines until the user's preferred criteria is matched to bet.

Figure 1:
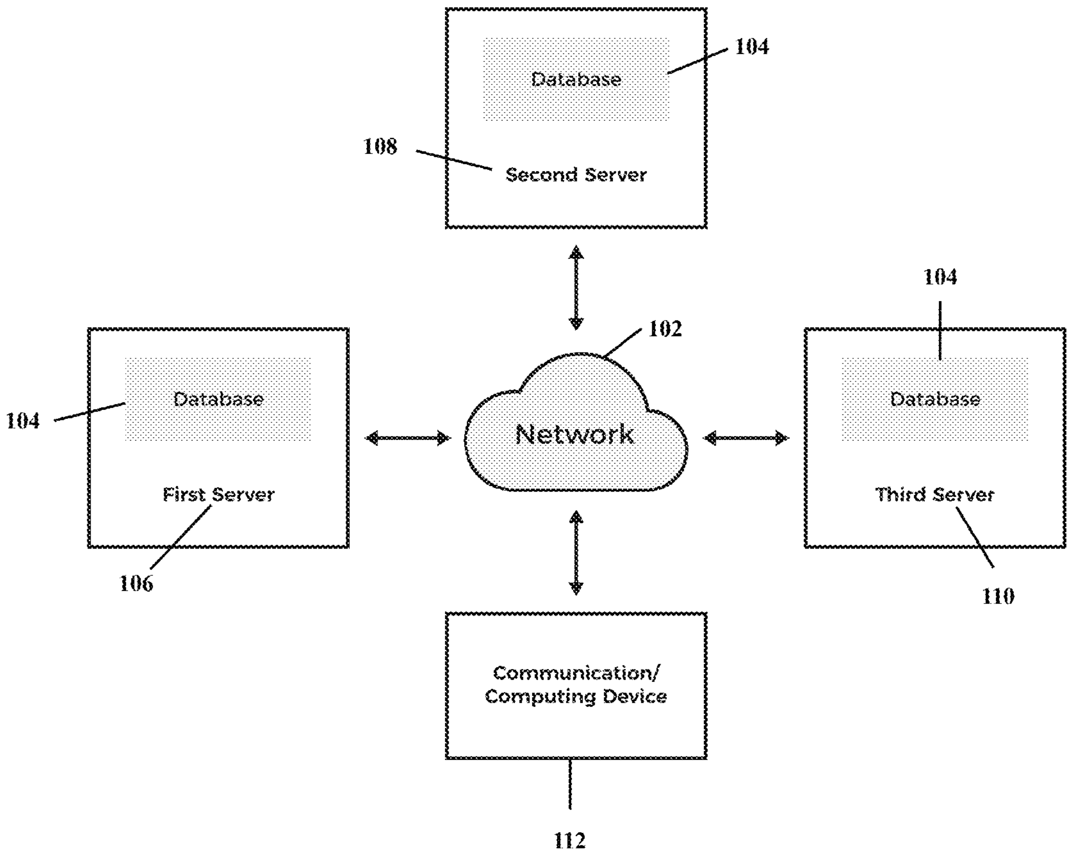
FIG. 1 illustrates an exemplary gaming environment for operations and devices in accordance with the disclosed embodiments.

FIG. 1 shows an exemplary environment for operations and devices according to some embodiments of the present invention. As illustrated in FIG. 1, the environment may include a communications/computing device 112, a data communications network 102, a first server 106, a second server 108, and a third server 110. The communications device 112 allows a user of the communications device to view events pre-game and in real time in order to place limit bets as well as tag bets in order to add to their watchlist and track. Typically, the communication device 112 allows the user of the communication device to view various sports betting events and lines, which would then lead to multiple limit bet opportunities as well as being able to tag certain lines they would want to track. This is done through utilizing bi-directional communications of the remote device with one or more servers over the data communications network 102. Example of communication devices 112 include a Smart-phone, laptop computer, a desktop computer, a web capable mobile terminal, or any device capable of communicating with the network.

Figure 2:
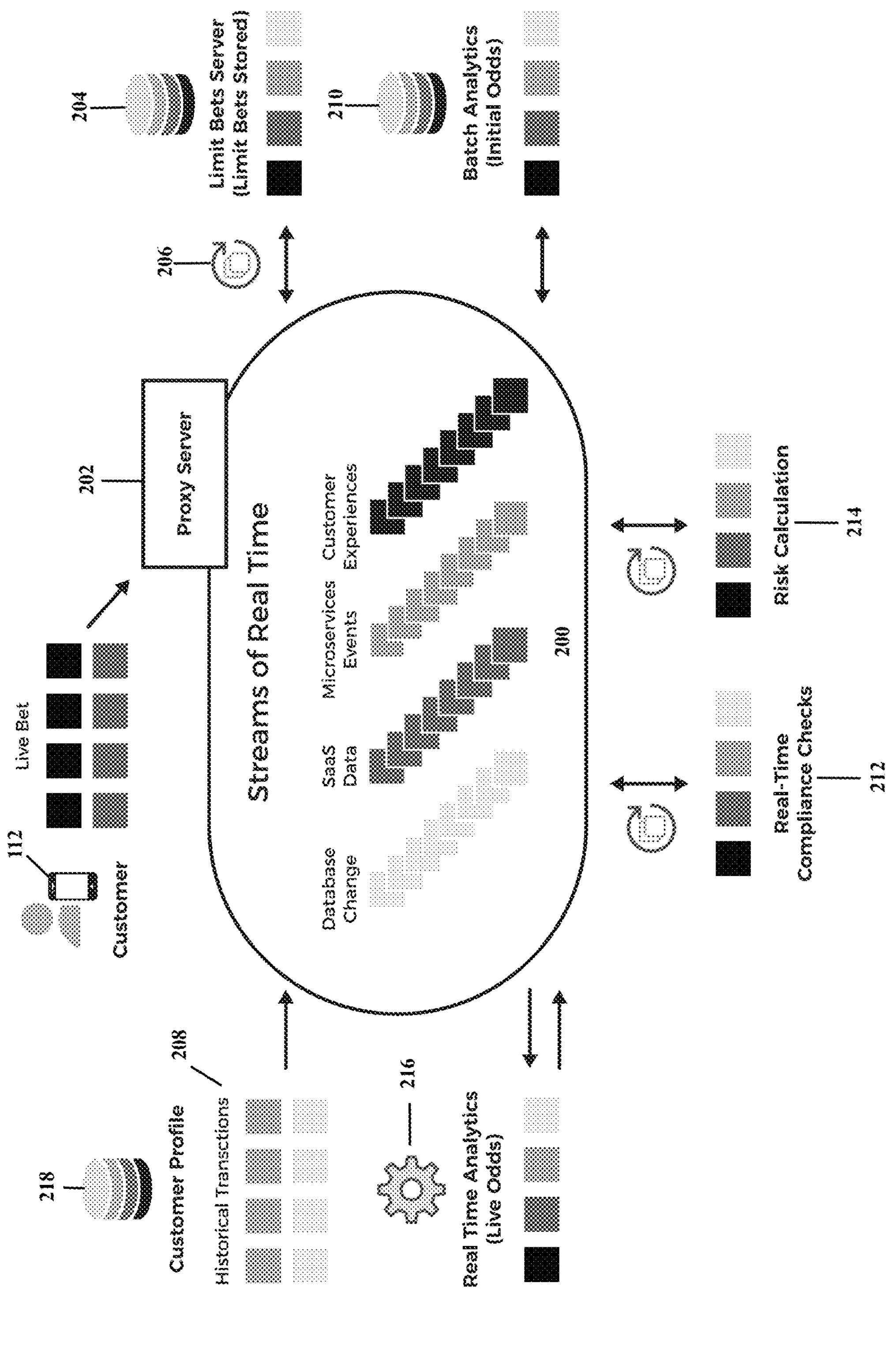
FIG. 2 illustrates an exemplary environment of a real time betting infrastructure in a gaming environment.

FIG. 2 illustrates a real time betting infrastructure environment. A customer or user would place a bet on their communication device 112, which would then enter into a proxy server 202 which then would access the betting infrastructure. Typical servers 202 included in a real time betting infrastructure 200 are batch analytics 210, historical transactions 208, real-time compliance checks 212, risk calculation 214, and real time analytics (live odds) 216 but there are scenarios where additional servers may be incorporated as well. The squares illustrate the streams of real time events, and how they would be impacted if a certain server where to go down. For example, if the server for Real-time compliance checks went down, all streams of real time events would be impacted. FIG. 2 shows how a limit bet server 204 would interact in this environment. A database would host the limit bets placed by the user, and there would be constant updating and refreshing to ensure the limit bets are being matched and placed to the real time odds 216. The limit bet server 204 would have all boxes since they would have impact on all streams of real time events 200 if the server were to go down. While not shown in the image, there is also an infrastructure where the limit bets are blind to the sportsbooks or those providing the live odds. The reasoning for this is for the best interest of the users and possible compliance issues that may arise. Sportsbooks or real time live odd providers could manipulate lines in order to trigger certain limit bets that are advantageous to the sportsbook. Inserting a widget or other software solution would eliminate this risk, and ensure limit bets are triggered in good faith.

Figure 3:
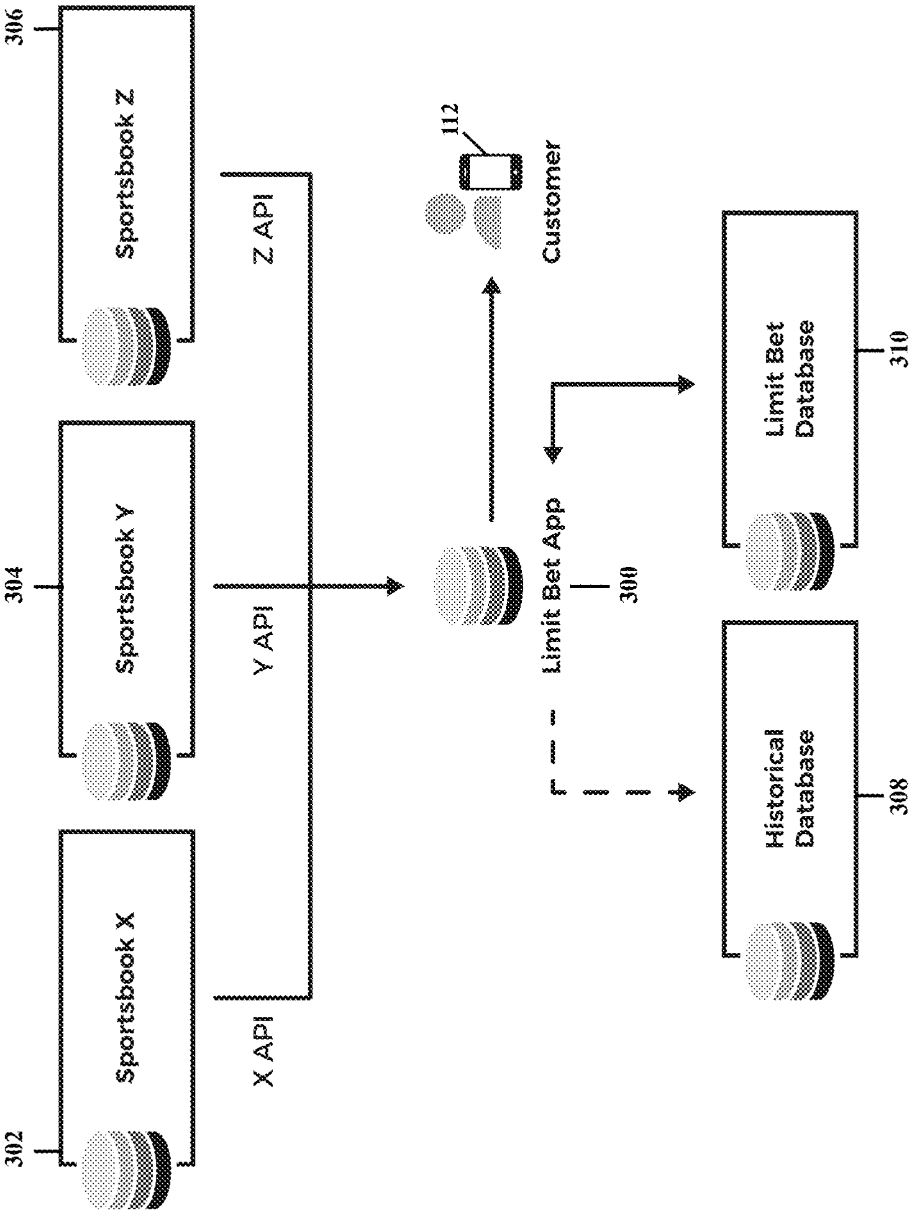
FIG. 3 illustrates an exemplary environment of multiple sportsbook APIs being fed into a limit bet application.

FIG. 3 illustrates an exemplary environment of multiple sportsbooks APIs 302, 304, 306 being fed into a limit bet application 300. There would be real time interactions between live lines provided by sportsbooks and the limit bets stored in the limit bet app database. There will also be on demand interaction with the historical database 310. Instead of being sportsbook specific like FIG. 2 illustrated, this would allow the user to get the best lines across all sportsbooks that are legal within one's state. The user would place their limit bets in the limit betting app 112, and once the criteria is met on a sportsbook, the bet would be triggered through automation and placed on the sportsbook that gets to the limit bet criteria the fastest, in accordance to what is in the limit bet database 310. Once triggered, a push notification will be sent to the end user for bet placement. It would then show as an open bet on the sportsbook, and the bet would be settled through their process. Users could also choose to get alerted on the limit bet application versus a bet automatically being placed as well. Since live lines vary greatly from sportsbook to sportsbook, this would be very advantageous to a user. This could also serve as a way to democratize betting, which many states are currently struggling with figuring out how to do. The limit bet application 302 would gather data and metrics with regard to users bets to show what book is consistently giving them the best lines for their limit bets, best lines by bet type, etc. This again shows how the uniqueness of limit bets and limit criteria alerting can be greatly beneficial to the user and the industry as a whole.

Figure 4:
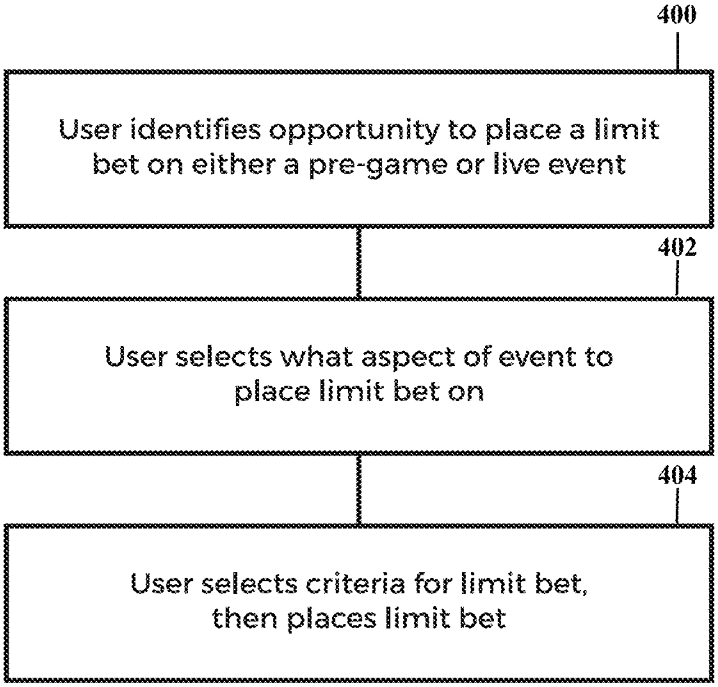
FIG. 4 illustrates a high-level flow chart of operations depicting logical operational steps of a method for enabling a remote device user to place a limit bet within a gaming environment.

FIG. 4 illustrates a high-level flow chart of operations depicting logical operational steps of a method for enabling a user to place a limit bet within a gaming environment. Once a user identifies the event they would like to place the limit bet on (e.g. a full game spread, 1st Half Over/Under points total, etc.) either pre-game or live event 400, the user would then select that aspect of the event to place the limit bet 402. Once selected, a bet screen will pop up where the user must select the criteria of the bet which will include the line, juice, and the timeframe of the bet (e.g. the line and juice criteria must be met in the specified timeframe or it would turn into a no bet). Once all criteria is selected, the user places the limit bet 404.

FIG. 5 is an example of the pre-game component of the present invention. In accordance with the preferred embodiment of the present invention, FIG. 1 shows betting lines on a football game before the start of the game 500. To keep this as simple as possible, the image shows the full game spread, full game money line (Win), and the full game total. The figure also shows the Time Frame Dropdown 502, which bettors can select as they may only like their criteria bet for a certain duration of the game. Bettors are able to set target criteria on quarter spreads, halves, team totals, player props, etc.

Figure 6:
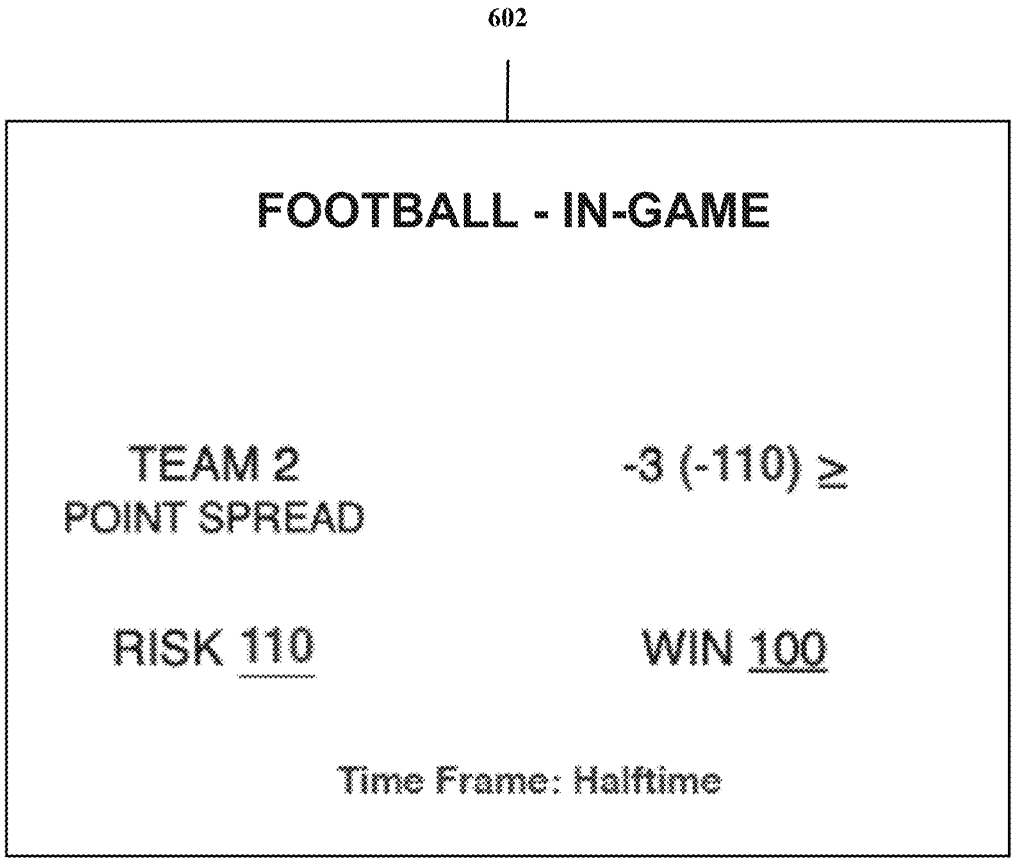
FIG. 6 is an example of the pre-game target bet component of the present invention.

FIG. 6 is an example of the pre-game target bet component of the present invention. In accordance with the preferred embodiment of the present invention, FIG. 2 shows how the betting slip 602 would look with the pre-game target bet. While the bettor likes Team 2, they would feel more comfortable with the line at −3 instead of −6. The bettor would simply log their target point spread they want for the time frame of the game (this user selected by halftime), state what juice or better they would want it at, and how much they would like to Risk to Win. In this scenario, the pre-game bet being locked in is Team 2 −3 at −110 juice or better (meaning if the line passed over the −110 juice and instead was offered at +100 juice, +110 juice, etc. the bet would still be placed, but the Risk/Win would change.

FIG. 7 is an example of the in-game component of the present invention. In accordance with the preferred embodiment of the present invention, FIG. 3 shows a scenario of the line changing during the game. In this instance, Team 1 had an early score, which then moved the line in their favor.

FIG. 8 is an example of the in-game target bet component of the present invention. In accordance with the preferred embodiment of the present invention, FIG. 4 shows an example of a bettor creating an in-game target bet. With knowing that his −3 bet is now locked in, and still really liking the Team 2 side, the bettor decides he would now like to take Team 2 live money line, but it is a little more juiced than he would like. He now sets a live money line target bet on Team 2, at −110 juice or better for the Full Game, risking $110 to win $100.

Figure 9:
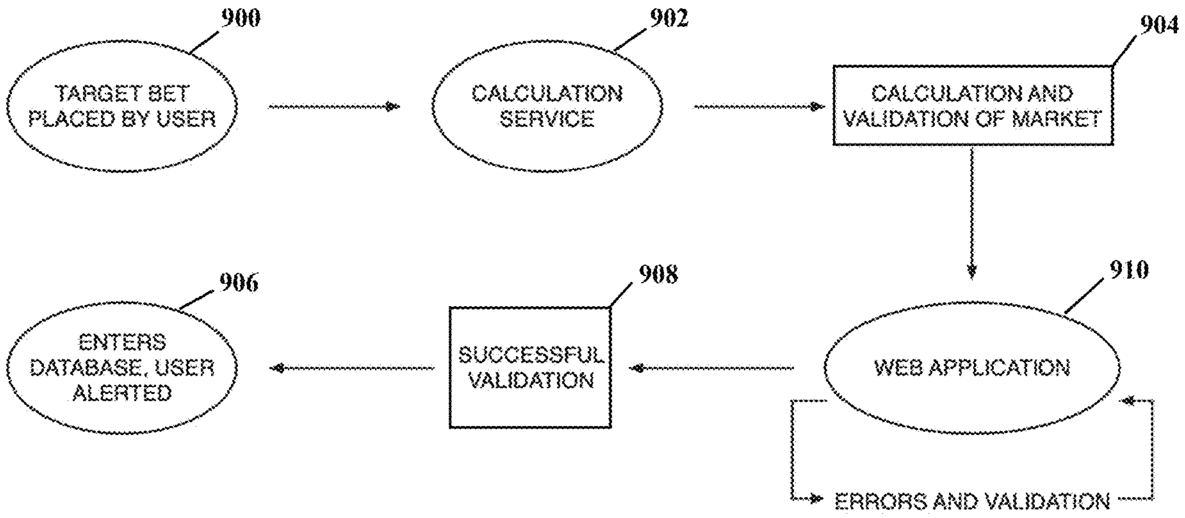
FIG. 9 is a diagram of the bet placement flow of the present invention.

FIG. 9 is a diagram of the bet placement flow of the present invention. In accordance with the preferred embodiment of the present invention, wherein the target bet is placed by the user 900 followed by a calculation service of said target bet 902. The target bet is then calculated and validated by the market 904 via the live lines of the sportsbooks, and then entered into the mobile application 906. The mobile application processes any potential errors and validation of the data, and if the validation is successful 908, the bet enters the database and the user is alerted. Once bet placement is successful, the user bet will be alerted that their target bet has been placed via a mobile alert, and will then appear as an open bet in the user's betting history. This is all executed through the web application 910 which sends errors and validation.

Figure 10:
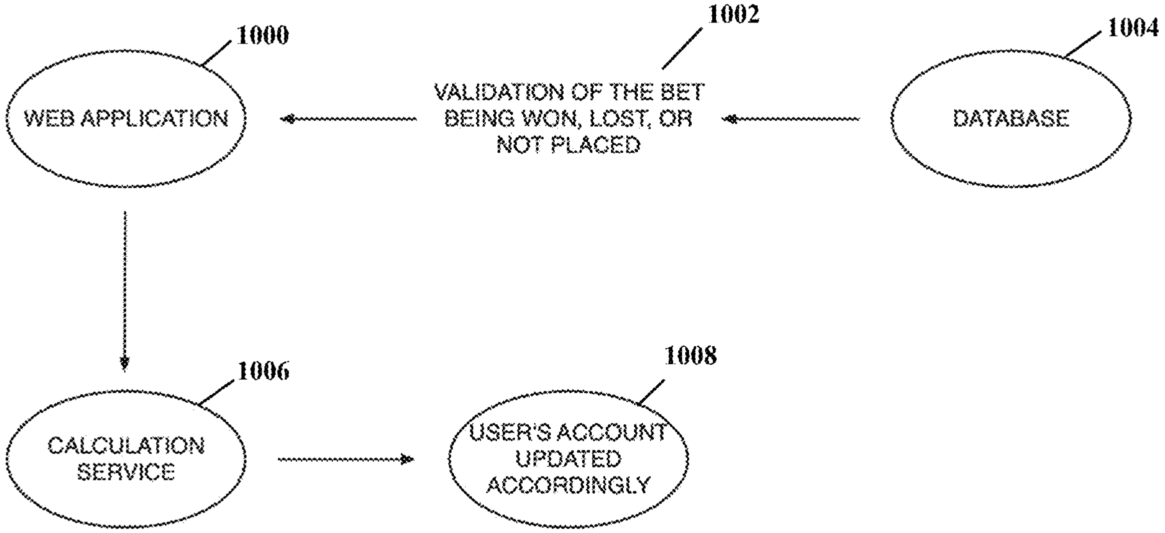
FIG. 10 is a diagram of the bet settlement process of the present invention.

FIG. 10 is a diagram of the bet settlement process of the present invention. In accordance with the preferred embodiment of the present invention, if the bet wins, the risked amount along with the win amount are credited to the user's account. If the criteria on the target bet is not met 1002, the risked amount will be credited to the user's account 1008. There are calculation services 1006 that determine the validity of vets. If the bet is lost 1002, the house keeps the wagered amount. Importantly, a bettor establishes its own bettor wallet, so that wins and losses are aggregated in real time or near real time or periodically or at predefined intervals, so that a bettor is kept aware via a series of alarms of wins and losses that have accumulated or are going to accumulate (based on AI), so that a better is able to manage placed bets to augment winnings and mitigated against losses. A bettor's wallet may be established locally, for example, in a bettor smart device such as a smartphone, or, bettor's wallet may be established in a cloud server with the usage of a web application 1000. Then, bettor's wallet may be configured and interconnected with traditional banking databases or cryptocurrency exchanges, so that the benefits of winnings may be realized by the bettor or better may choose to replenish a bettor's wallet so that more bets may be placed. Bettor's wallet may be funded via mobile applications connected to the bettor's wallet, either by direct deposit, or any other automatic or manual funding software. Credit card, PayPal, or any other crypto currency or traditional funding portals may be utilized for funding bettor's wallet or extracting winnings from a bettor's betting account.

Figure 11:
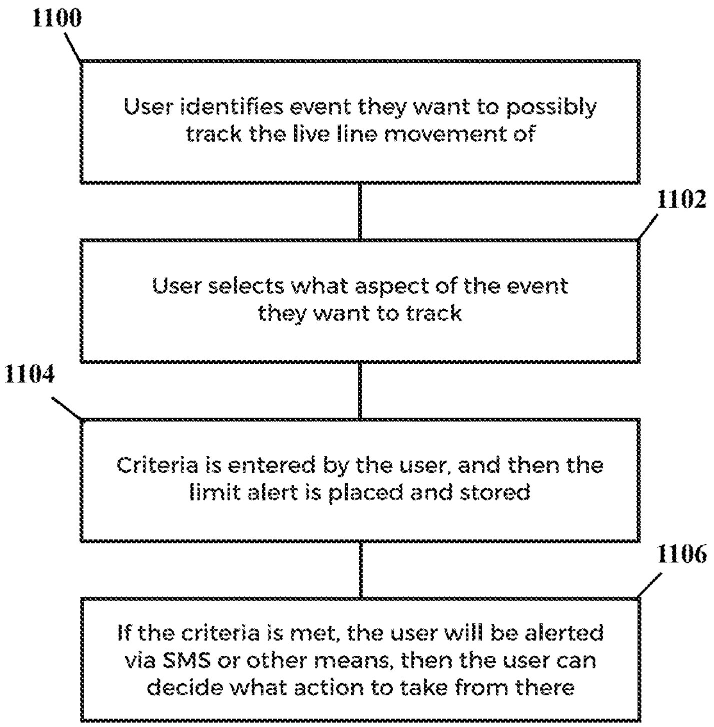
FIG. 11 illustrates a high-level flow chart of operations depicting logical operational steps of a method for enabling a remote device user to place an alerting limit bet within a gaming environment.

FIG. 11 illustrates a high-level flow chart of operations depicting logical operational steps of a method for enabling a remote device user to place an alerting limit bet within a gaming environment. This process would follow the same operational steps as explained for FIG. 4, including a user identifying an even they want to track 1100 but the key difference would be after selecting all criteria 1102, the user would get the option to place as an Alert versus a limit bet 1104. While they would be stored in different locations within the app, the process of the user being alerted once the criteria is met 1106 would be the same as a regular limit bet.

Figure 12:
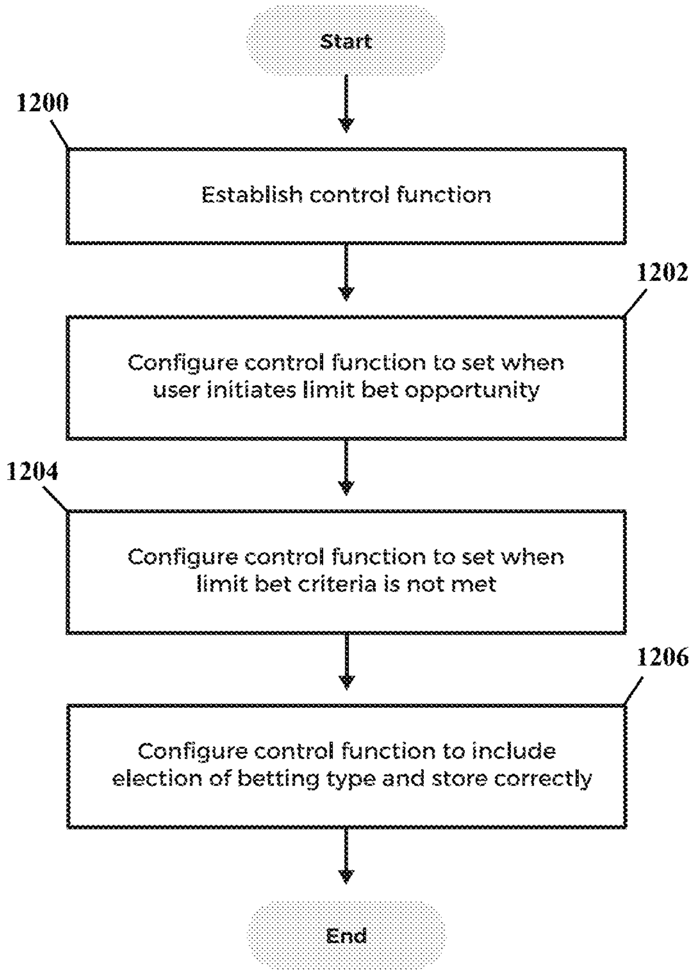
FIG. 12 illustrates a high-level flow chart of operations depicting a method for configuring a control function for setting limit bets, in accordance with the disclosed embodiments.
Figure 13:
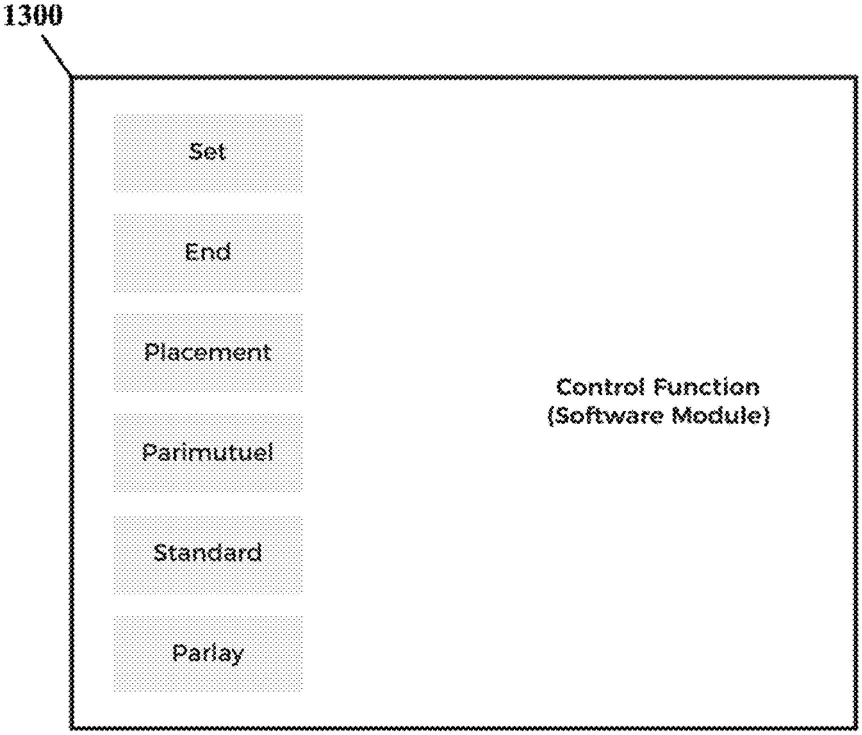
FIG. 13 illustrates a block diagram of the control function for setting limit bets, in accordance with the disclosed embodiments.
Figure 14:
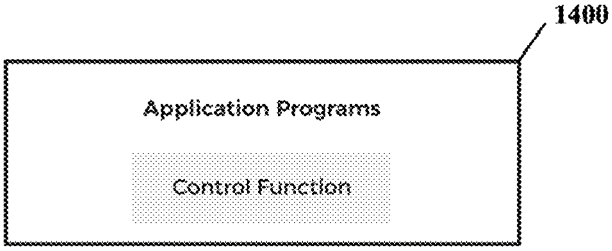
FIG. 14 illustrates a block diagram of application programs, including the control function, in accordance with the disclosed embodiments.

FIG. 12 illustrates a high-level flow chart of operations depicting a method for configuring a control function for setting limit bets, in accordance with the disclosed embodiments. With the established control function 1200, the control function may be configured to set when the user initiates a limit bet opportunity 1202. The control function can be configured to set when limit bet criteria is not met. Lastly, the control function can be configured to include an election of the betting type and store correctly 1206. FIG. 13 and FIG. 14 provide further detail as to the functionality around a control function.

FIG. 13 illustrates a block diagram of the control function for setting limit bets, in accordance with the disclosed embodiments. Note that as indicated in FIG. 12, particular software modules are shown with respect to the control function 1300 (which is also preferably implemented as a software module). These sub-modules include, for example, a module for setting when a limit betting opportunity begins and a module for designating when a limit bet opportunity ends. Modules and respectively implement parimutuel, standard, or parlay methods of betting. There can of course be other types of sub-modules that may be utilized in the context of this control function to provide other control functionalities.

F FIG. 14 illustrates a block diagram of application programs, including control function, in accordance with the disclosed embodiments. Note that in a preferred embodiment, the application programs 1400 shown in FIG. 13 can include the control function 1400 module, along with other modules. Once a control function is established, the control function 1400 can then be configured to set when a limit betting opportunity begins. Similarly, the control function 1400 can be configured to set when the limit betting opportunity ends. Next, the control function 1400 can be configured to include a reset operation for when lines get taken down live, a major injury happens to a key player to drastically change lines, or any other instances where a reset may be needed. Lastly, the control function 1400 can be configured to include selection of a betting type, including parimutuel, standard, or parlay bets. Can also be understood that other betting types could be included as modules as well.

Figure 15:
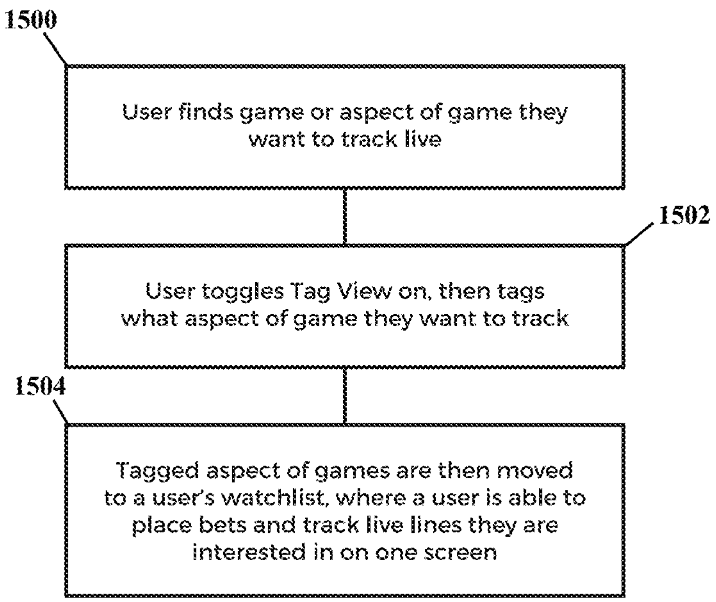
FIG. 15 illustrates a high-level flow chart of operations depicting logical operational steps for a user tagging particular lines in a game they want to track live.
Figure 16:
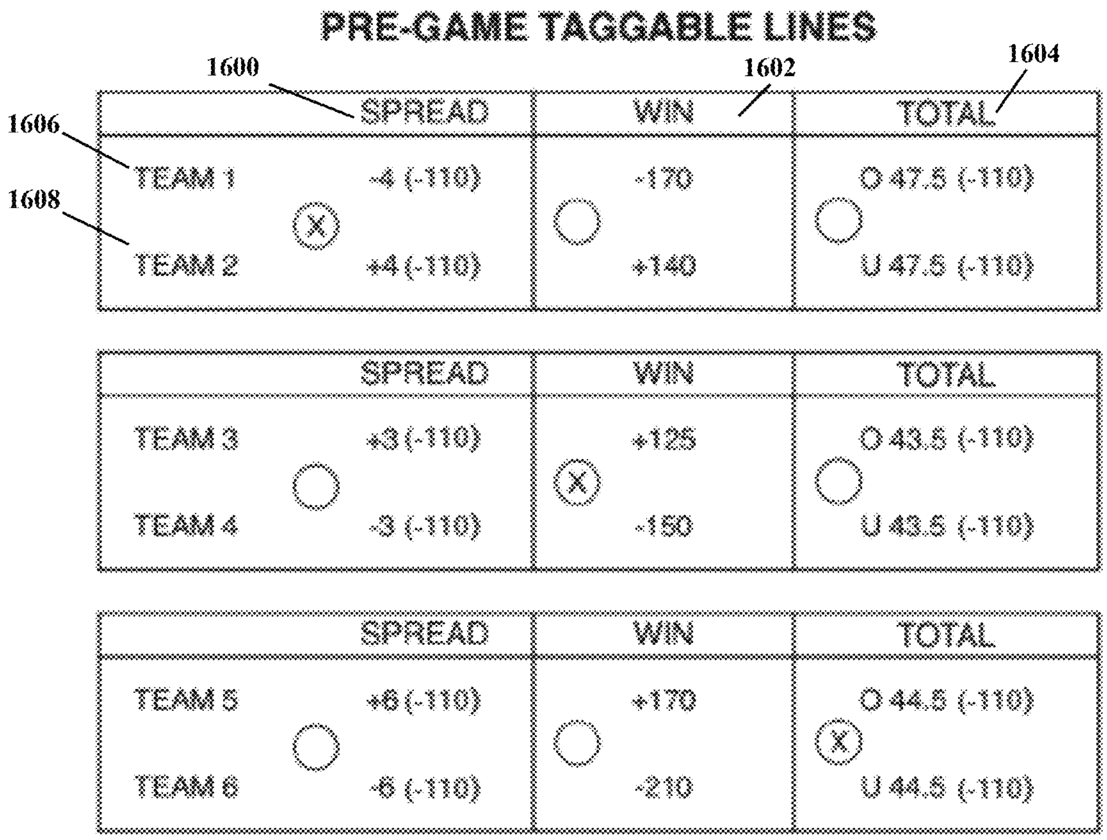
FIG. 16 is an example of the pre-game taggable lines of the present invention.
Figure 17:
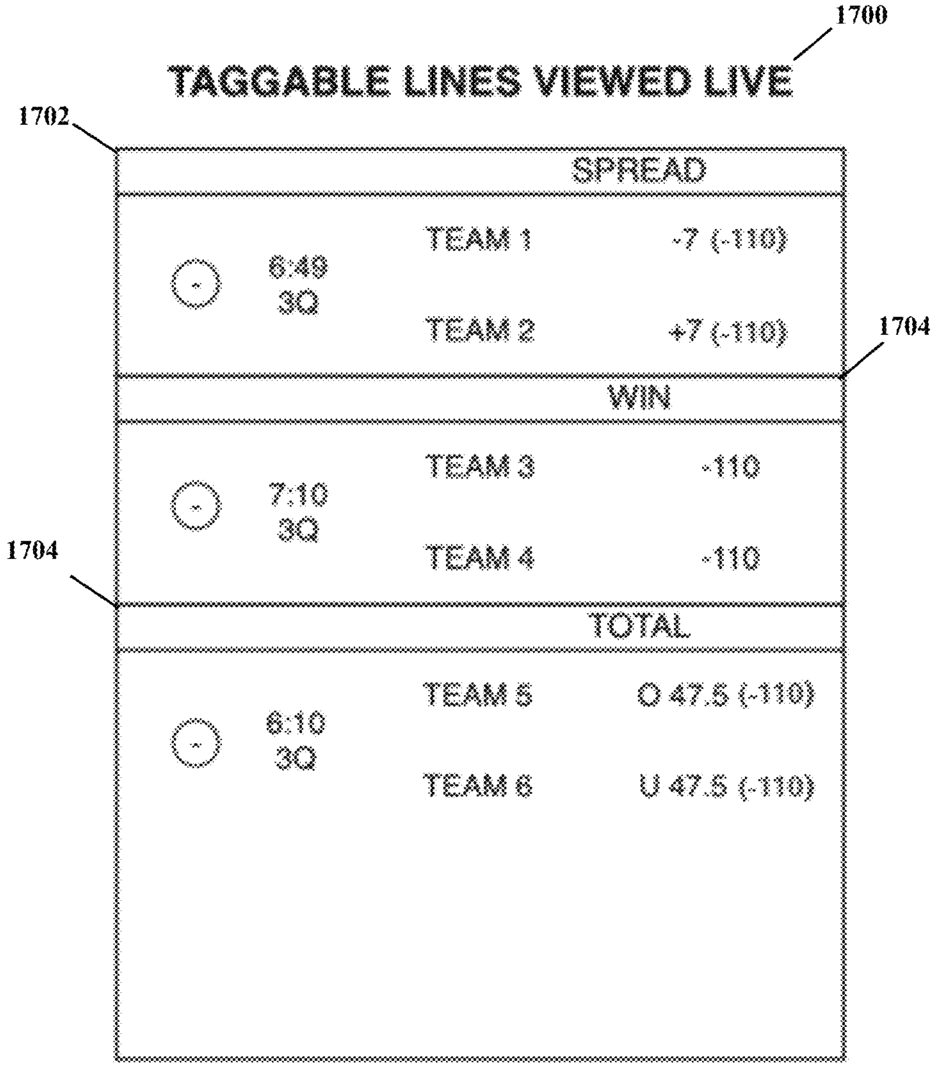
FIG. 17 is an example of the taggable lines viewed live of the present invention.

FIG. 15 illustrates a high-level flow chart of operations depicting logical operational steps for a user tagging particular lines in a game they want to track live 1500. A user may toggle the Tag View on, and tag aspects of the game they want to track 1502. Lastly, the tagged aspect of the games are moved to a user's watchlist, where a user is able to place bets and track live lines they are interested in on one screen 1504. FIG. 16 and FIG. 17 provide further detail as to how it would appear to a user, and the functionality and significance it would have.

FIG. 16 is an example of the pre-game taggable lines of the present invention. In accordance with the preferred embodiment of the present invention, FIG. 16 is showing pre-game lines, including the team 1606, 1608, spread 1600, win 1602, and total 1604, allowing the user to tag certain games and bets that the user wants to track live during the game. The present invention would allow the user to tag any live line made available by the book. Once the specific betting line is tagged, it will then transfer over to a watchlist where all of the user's tagged games will appear. The user is able to add and remove tagged games whenever necessary, as long as the line is being offered by the sports book.

FIG. 17 is an example of the taggable lines 1700 viewed live of the present invention. In accordance with the preferred embodiment of the present invention, FIG. 17 displays the tagged bets (also shown in FIG. 16) on a watchlist screen. Instead of clicking around different games to search for live lines, the user is able to easily keep track of live lines to potentially bet on. Regular bets along with limit bets are processed on the watchlist screen. If the user does not want to track that certain line any longer, they can simply remove the bet from the watchlist screen my clicking the – button. The design features a spread 1702, wins 1704, as well as totals 1704. The limit betting concept coupled with a live, taggable watchlist screen of betting lines that the user wants to follow allows for greater ease and accessibility, improving on the overall user experience.

Figure 18A:
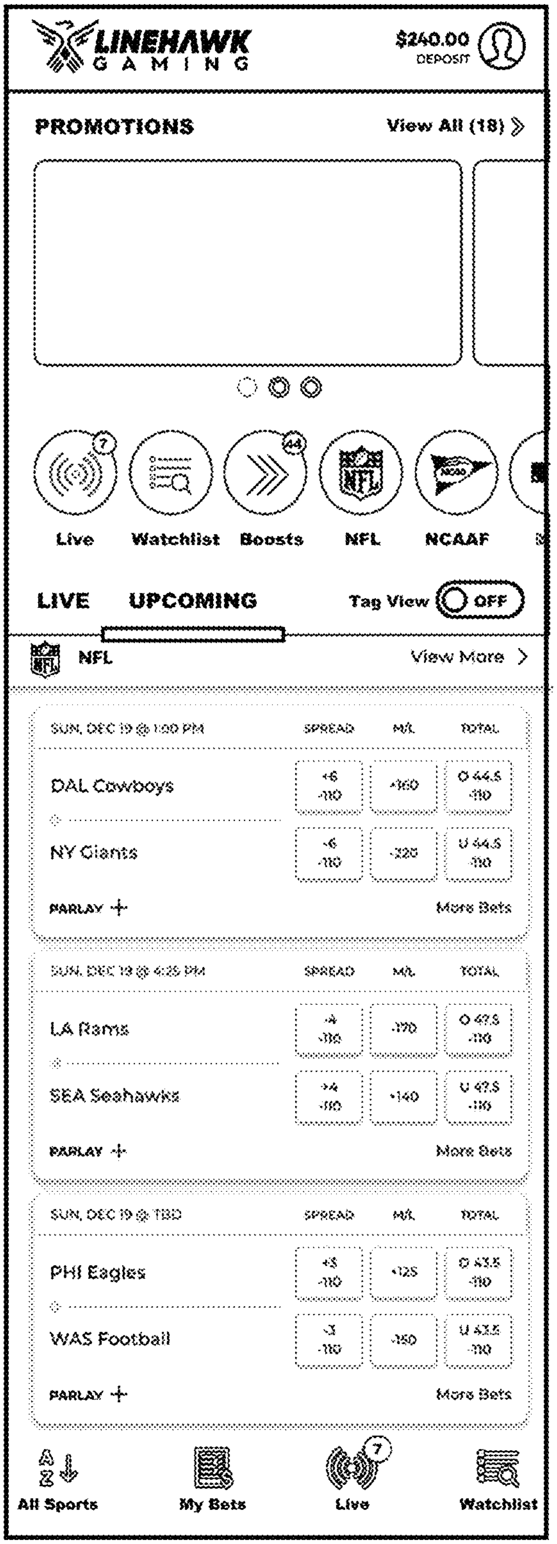
FIGS. 18A-S are images of the user interface of the present invention.

FIG. 18A is an example of the user interface of the present invention showing the main screen once signed into the sports book. I would like to highlight two key differences compared to what you see on sportsbooks today. Those being the Tag View toggle button, along with the Watchlist feature added to the main screen.

Figure 18B:
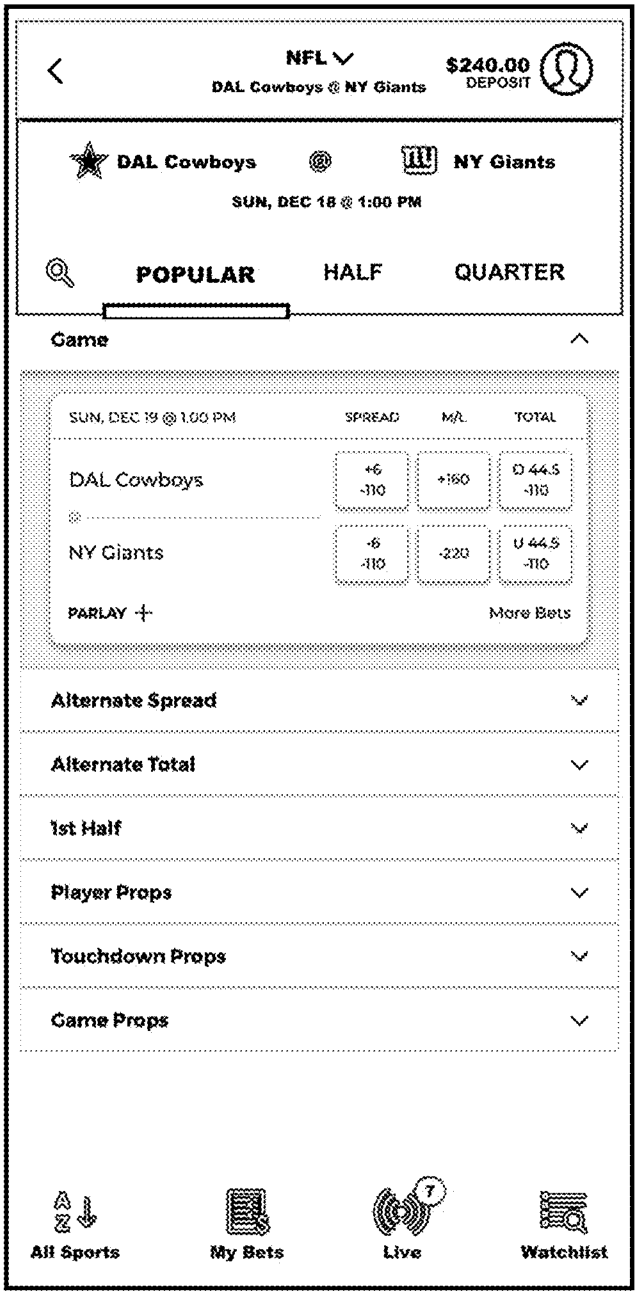

FIG. 18B is an example of the user interface of the present invention showing what the user will see once clicked into a game. Once a game is selected, the full game spread, money line, and full game total are viewable, as well as other bets for that given game.

Figure 18C:
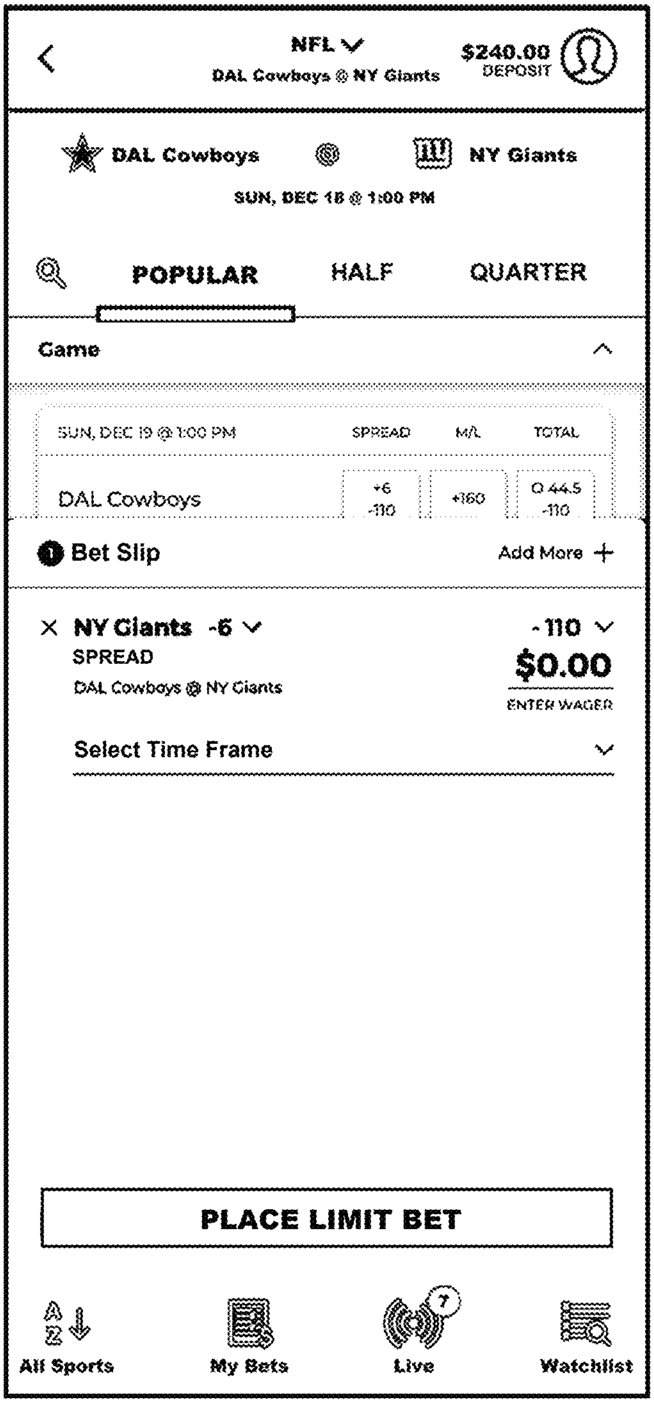

FIG. 18C is an example of the user interface once a bet type is selected, showing what the user would see once selecting what they would like to bet on. In this instance, the user selected the NY Giants full game spread at –6. What you also see is drop down arrows for the spread, juice, as well as for the time frame of the game.

Figure 18D:
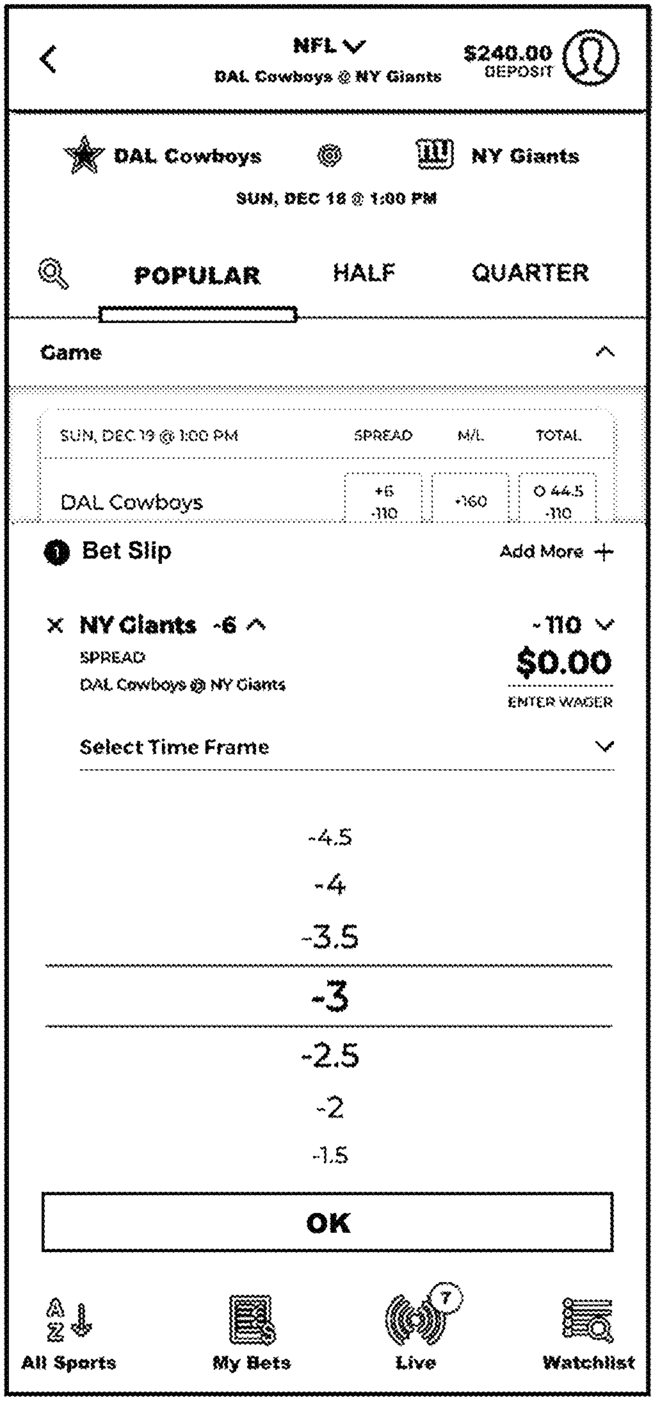

FIG. 18D is an example of the user interface where the user is selecting the limit criteria for the spread of the game, showing what the user would see once selecting the drop down for the spread number of the full game. From here, the user would be able to select a wide array of spreads they would be able to place as limit bets.

Figure 18E:
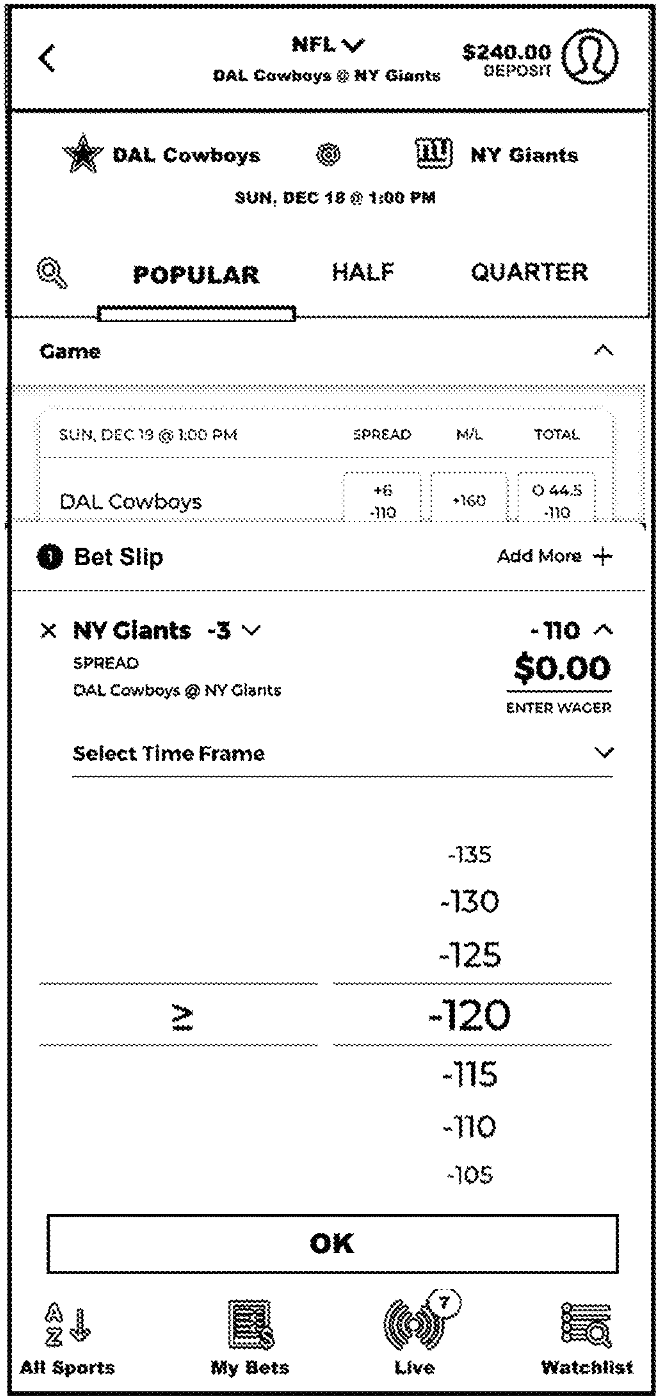

FIG. 18E is an example of the user interface of the present invention, where the user is selecting the limit criteria for the greater than or equal to juice. This diagram shows what the user would see once selecting the drop down for the juice on this current bet. They would be able to select from + or – lines, and the greater than or equal to function would be the default selection for the limit bet.

Figure 18F:
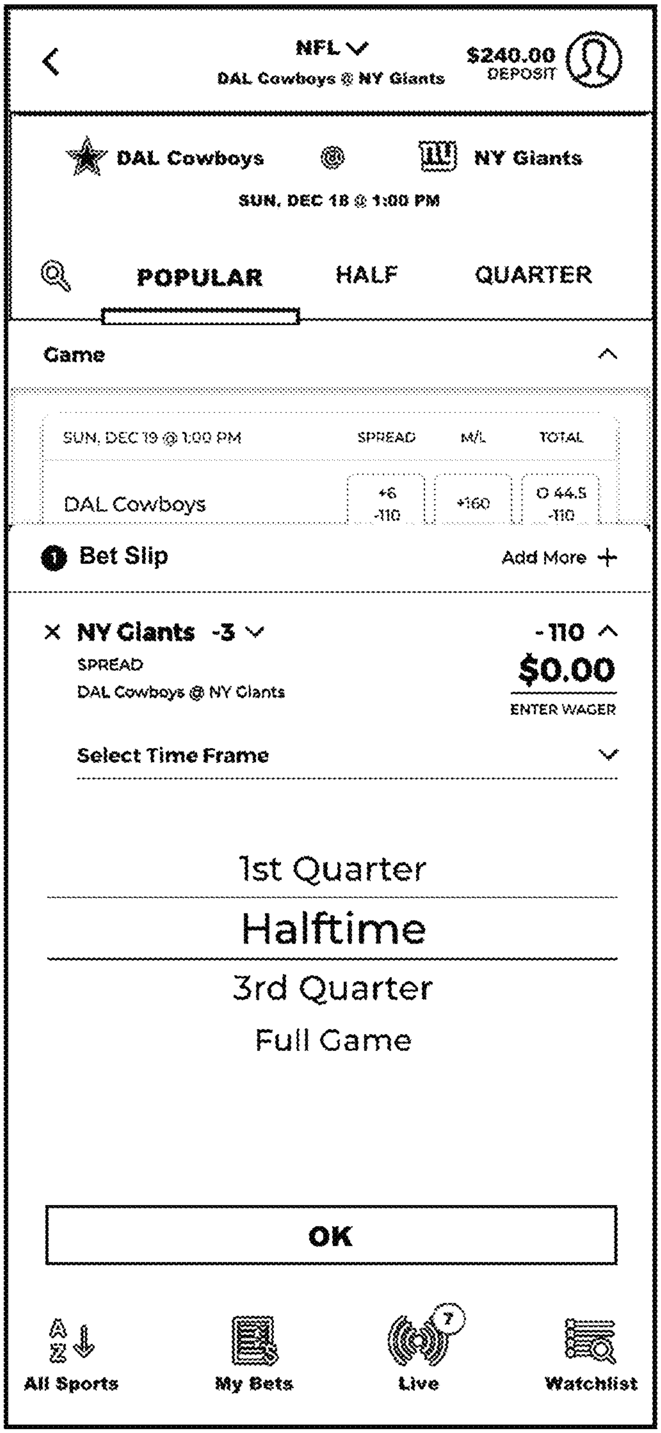

FIG. 18F is an example of the user interface where the user is selecting the limit criteria for the time frame of the bet, showing what the user would see once selecting the drop down for the time frame of the current bet. In this example, the sport is football, so the user is presented with 1st Quarter, Halftime, 3rd Quarter, and Full Game. The time frame selections would change sport to sport, so for example, if this was a hockey game, it would list 1st Period, 2nd Period, and Full Game.

Figure 18G:
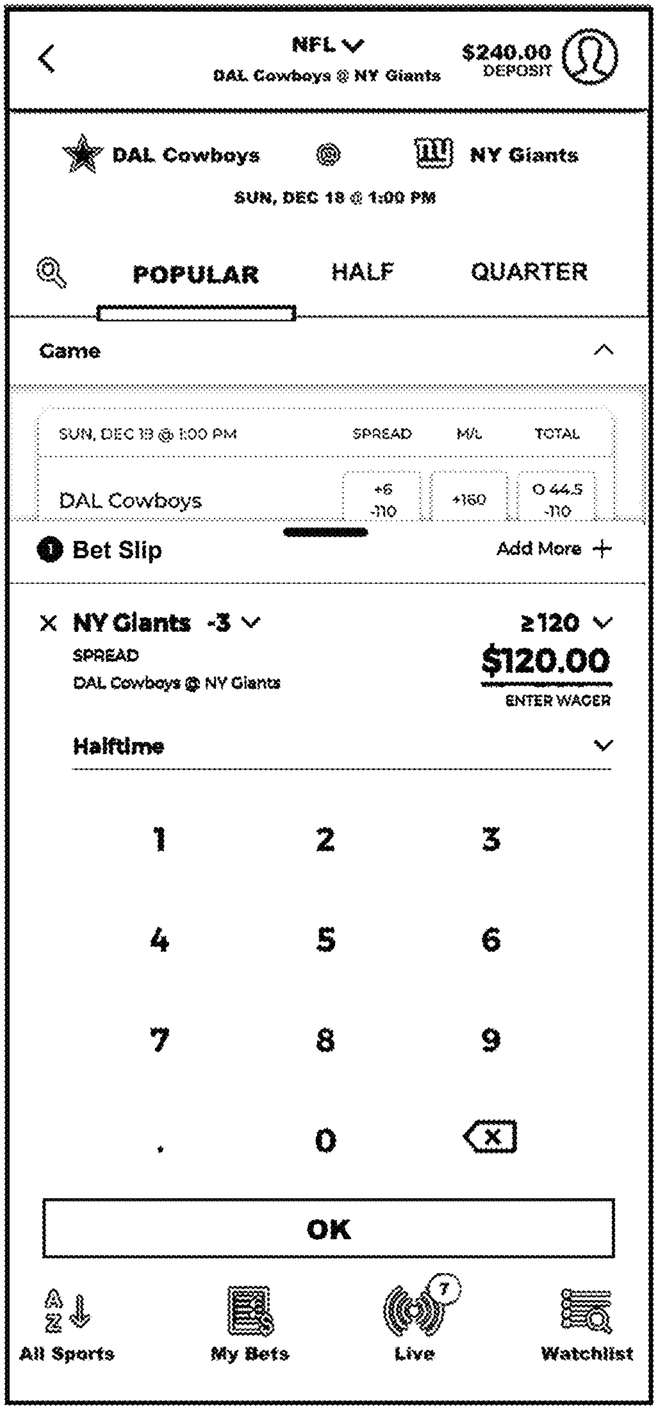

FIG. 18G is an example of the user interface where the wager amount is entered by the user, showing what the user would see once selecting how much they would like to wager. In this example, the amount wagered by the user is $120.00.

Figure 18H:
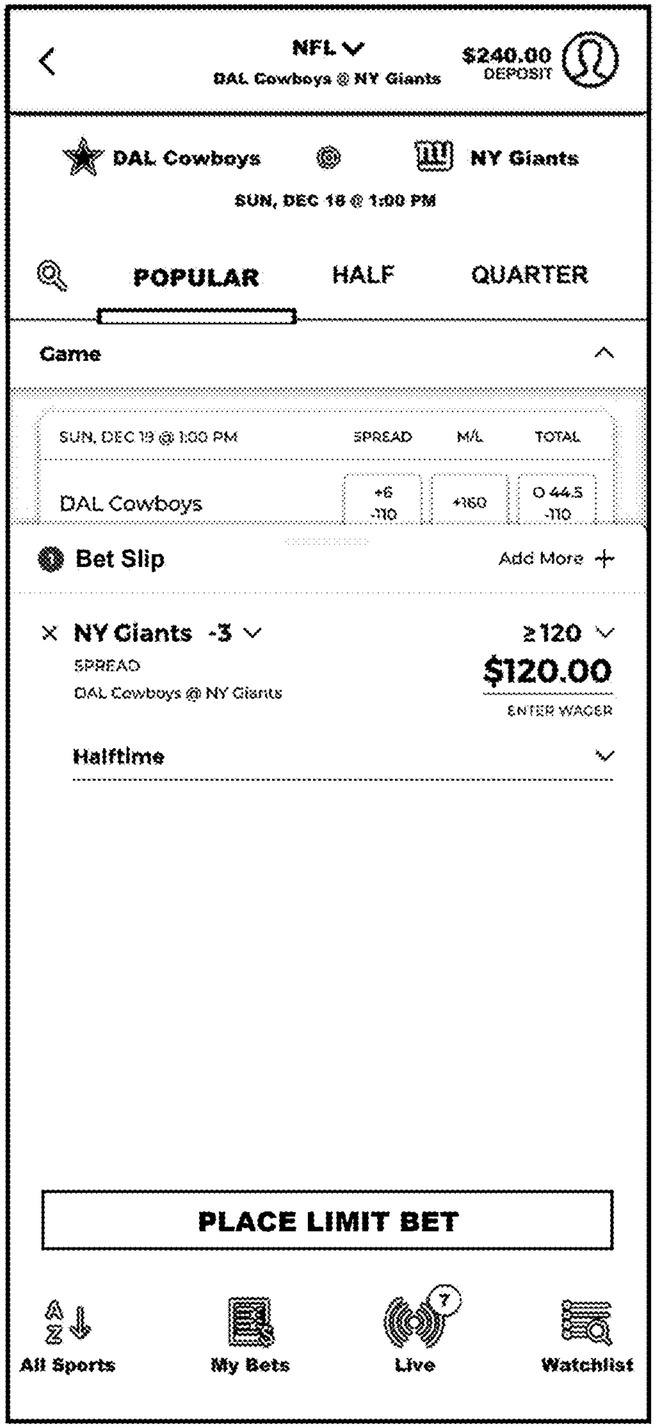

FIG. 18H is an example of the user interface where all required fields are filled out by the user, and the limit criteria bet is ready to be placed, showing what the user would see once all filled out elements for the limit bet are completed. In this example, the user is selecting the N.Y. Giants −3 at −120 or better odds for $120.00, and the bet criteria must be met before halftime. If the limit bet criteria is not met before halftime, it is simply a no bet.

Figure 18I:
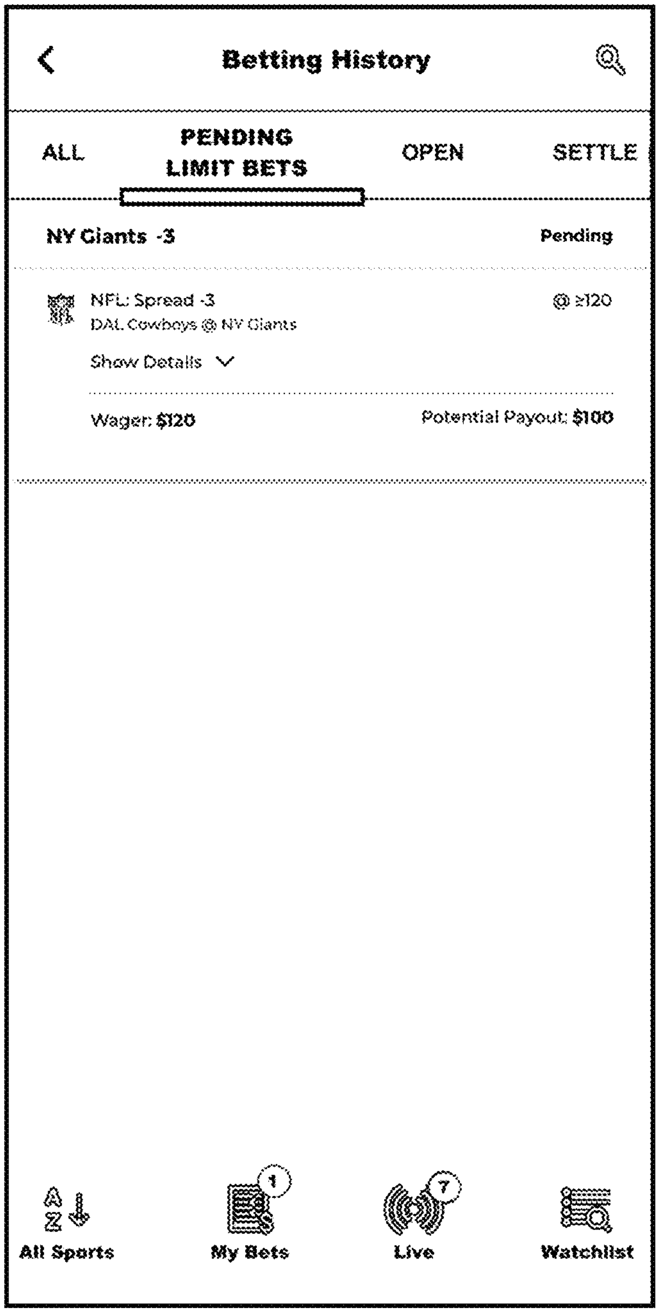

FIG. 18I is an example of the user interface limit bet showing as pending in the pending limit bets of the sportsbook, showing the pending limit bets component of the invention. The limit bet would stay in this portion until the bet is either triggered and would then move over to an open bet, or if the criteria is not met, it would turn into a no bet and move to a settled bet.

Figure 18J:

FIG. 18J is an example of the user interface of the present invention showing the criteria of the pending bet placed by the user being met on the live line in the given timeframe, showing the criteria of the user's bet being met. This bet is now an active bet for the user, with no further action being required on their end.

Figure 18K:
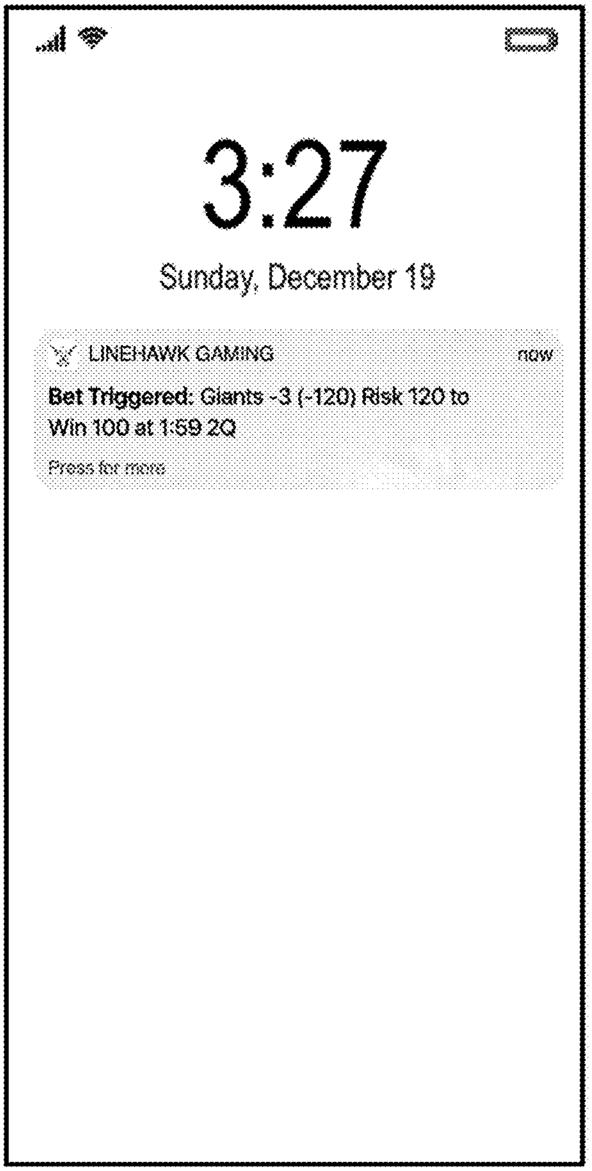

FIG. 18K is an example of the user interface of the present invention showing the alert the user would see when the bet is triggered. The alert incorporates the team, spread and juice the bet was triggered at, the risk and win amount, as well as what time during the game the bet was triggered.

Figure 18L:
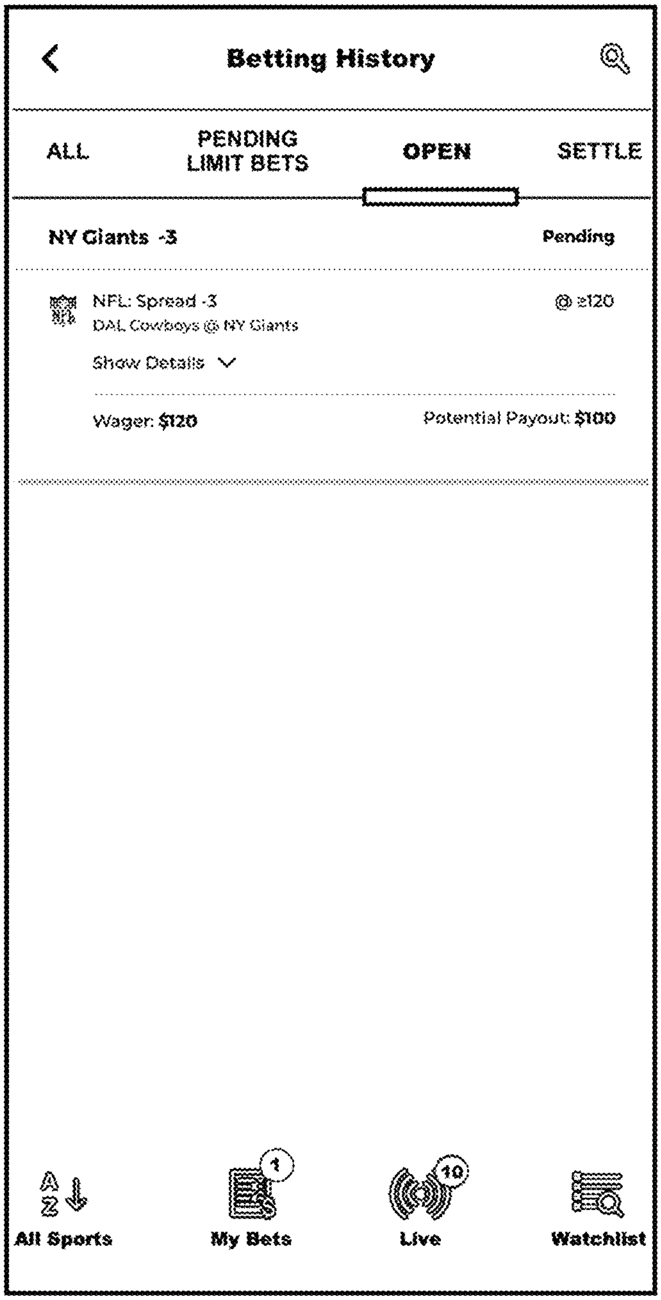

FIG. 18L is an example of the user interface of the present invention showing the bet being moved from the pending limit bets section to the open bets section, showing the bet now as an open, active bet.

Figure 18M:

FIG. 18M is an example of the user interface of the present invention showing the taggable view toggled to "on". From here, the user will be able to tag certain aspects of games they want to monitor on their watchlist.

Figure 18N:

FIG. 18N is an example of the user interface of the present invention showing the user tagging betting lines they want to track, where the user has selected what betting lines they would like to track. Tagging can happen either pre game or during the game, and consists of not only the main betting lines (full game spread, full game moneyline, and full game total), but also other aspects of the game such as 1st Half totals, 1st Half spreads, player props, etc. Essentially, the user will be able to tag and monitor any live lines offered by the sportsbook.

Figure 18O:
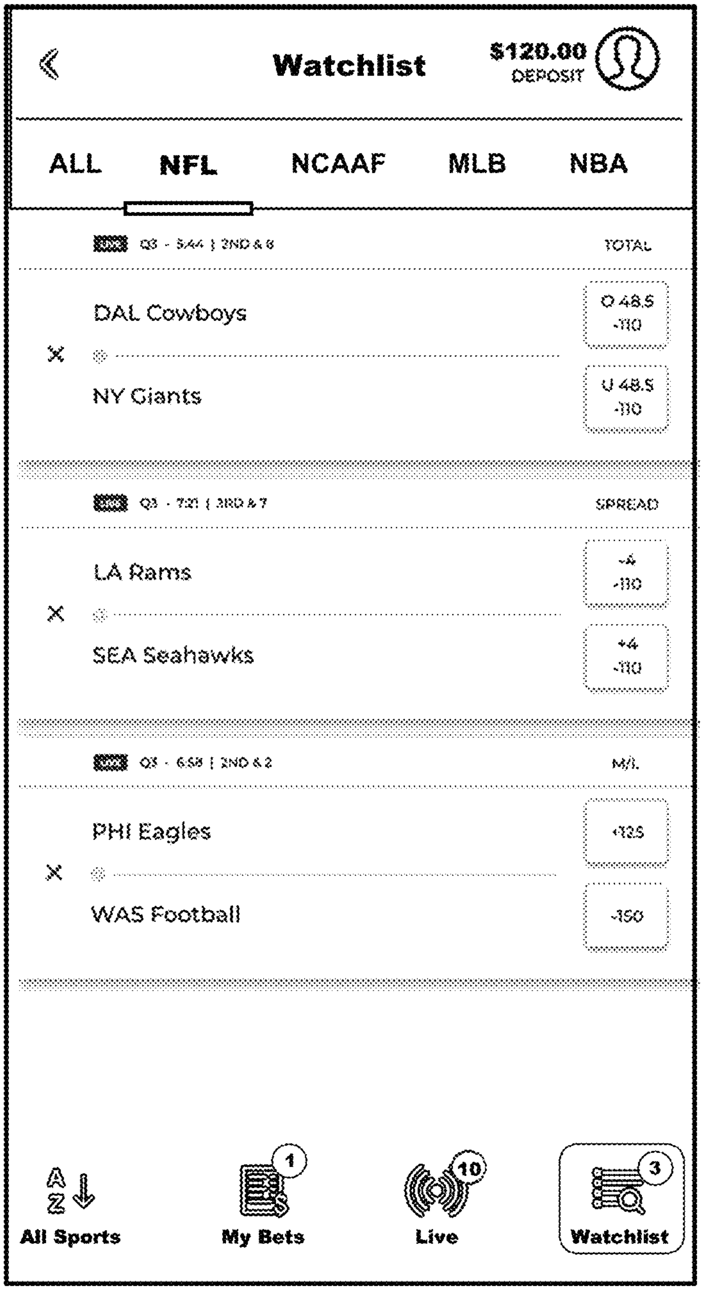

FIG. 18O is an example of the user interface of the present invention showing the users watchlist with the selected tagged betting lines. The watchlist is broken up by sport and would have a dropdown if you tagged multiple betting lines from a certain game. The user would be able to bet off of this screen.

Figure 18P:
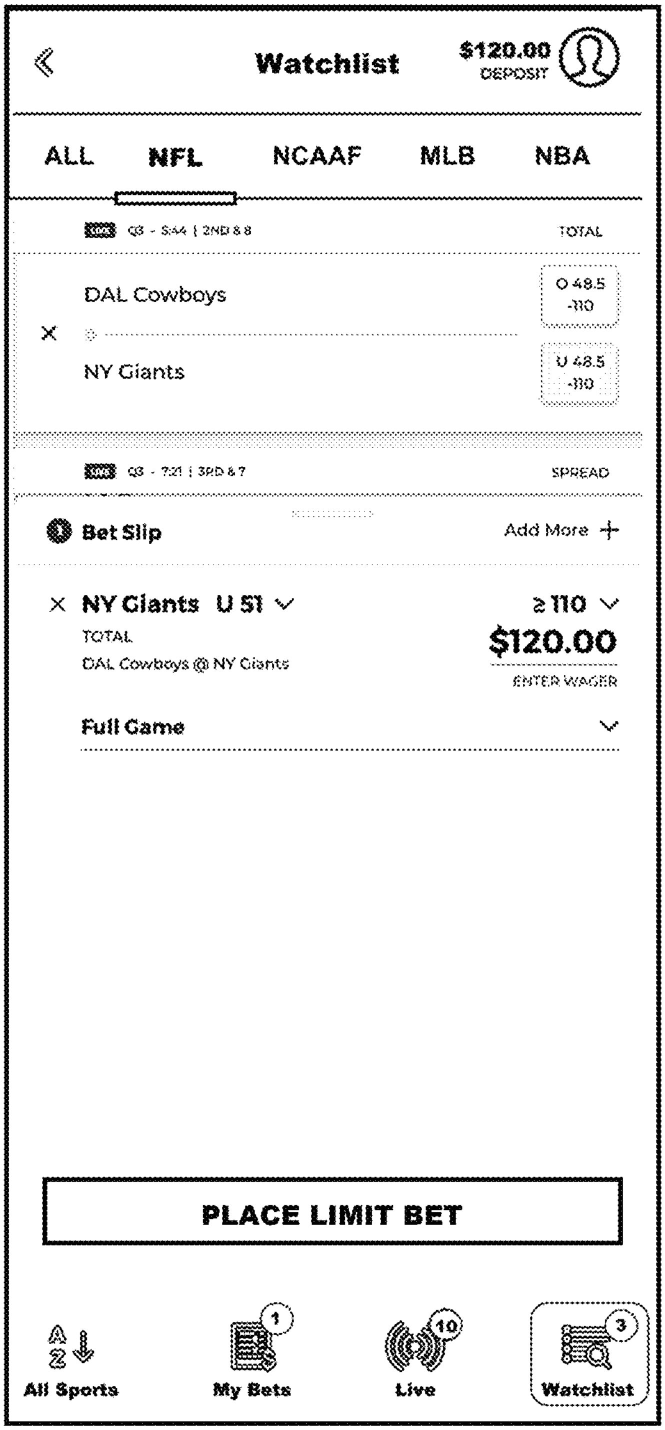

FIG. 18P is an example of the user interface of the present invention showing what the user would see once all filled out elements for the limit bet are completed, where all required fields are filled out by the user, and the limit criteria bet is ready to be placed off of the user's watchlist. In this example, the user is selecting the N.Y. Giants Over/Under for the full game from his watchlist. The user set the line at U 51 at −110 or better odds for $120.00, and the bet criteria must be met before the game is over. If the limit bet is not met before the end of the game, it is simply a no bet.

Figure 18Q:
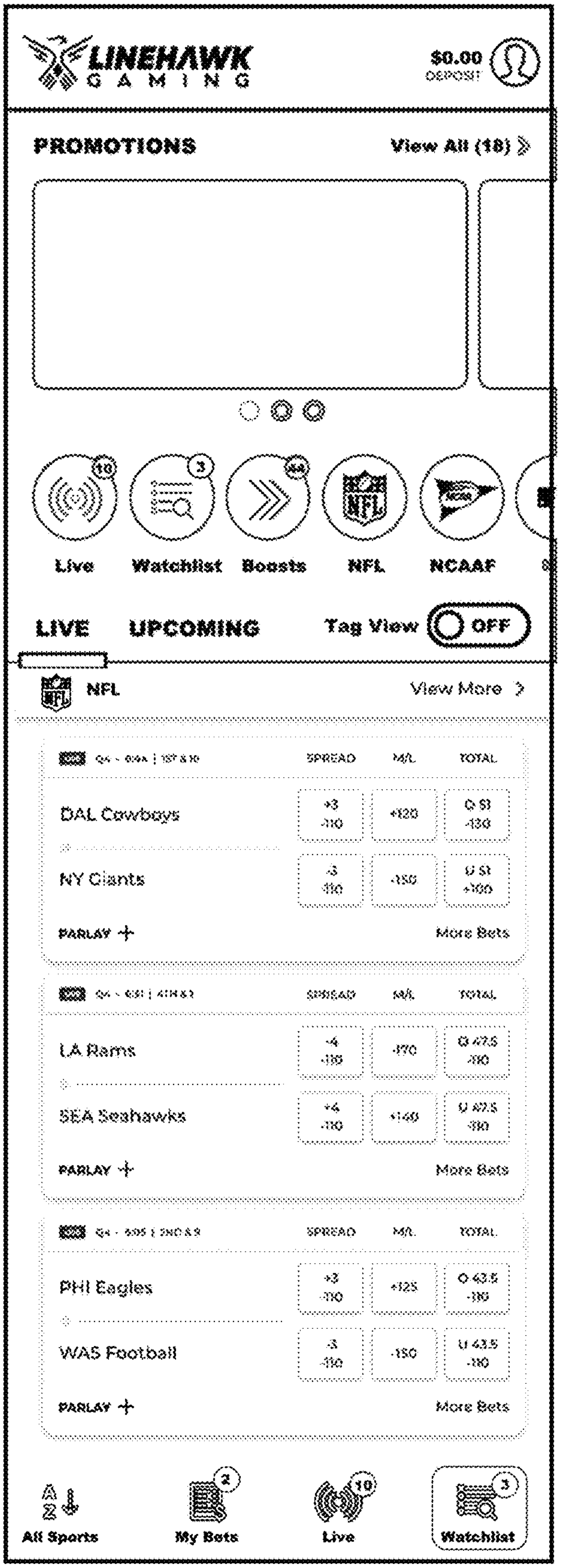

FIG. 18Q is an example of the user interface of the present invention showing the criteria of the pending bet placed by the user being met on the live line in the given timeframe. This bet is now an active bet for the user, with no further action being required on their end.

Figure 18R:
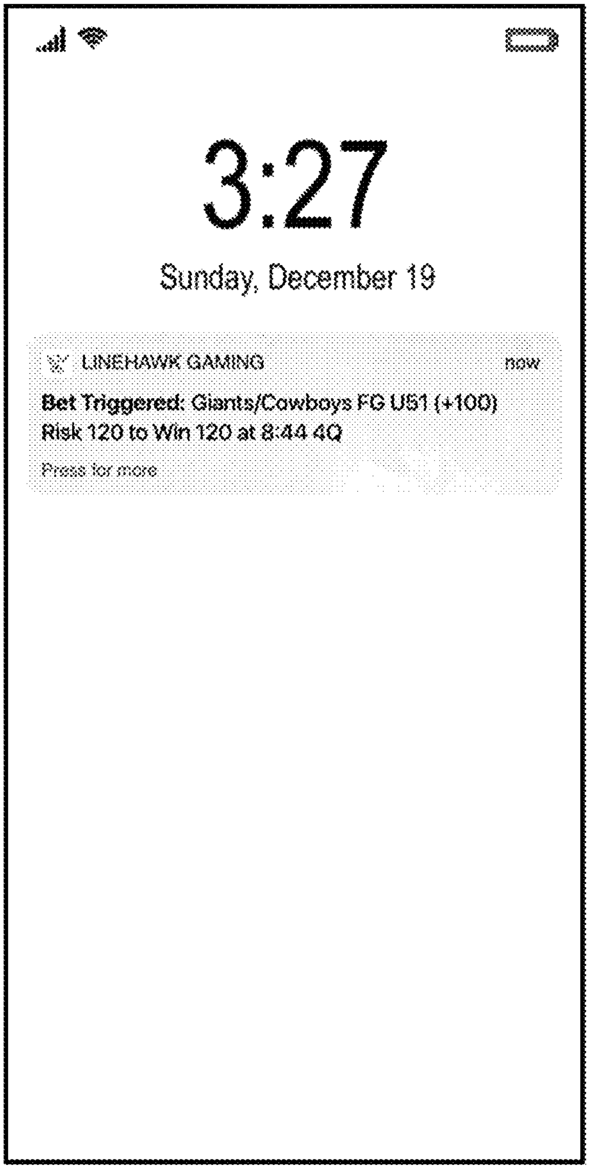

FIG. 18R is an example of the user interface of the present invention showing the alert the user would see, where the user is being alerted of the bet being triggered. The alert incorporates the team, spread and juice the bet was triggered at, the risk and win amount, as well as what time during the game the bet was triggered. Please note the better than or equal to odds for the current solution being shown as well. While the user's criteria had U51 at −110 odds or better, there was a sharp change in the odds, and the best available odds passed over −110 to +100. So instead of paying more for the same total, the solution has now locked in a bet risking $120.00 to win $120.00.

Figure 18S:
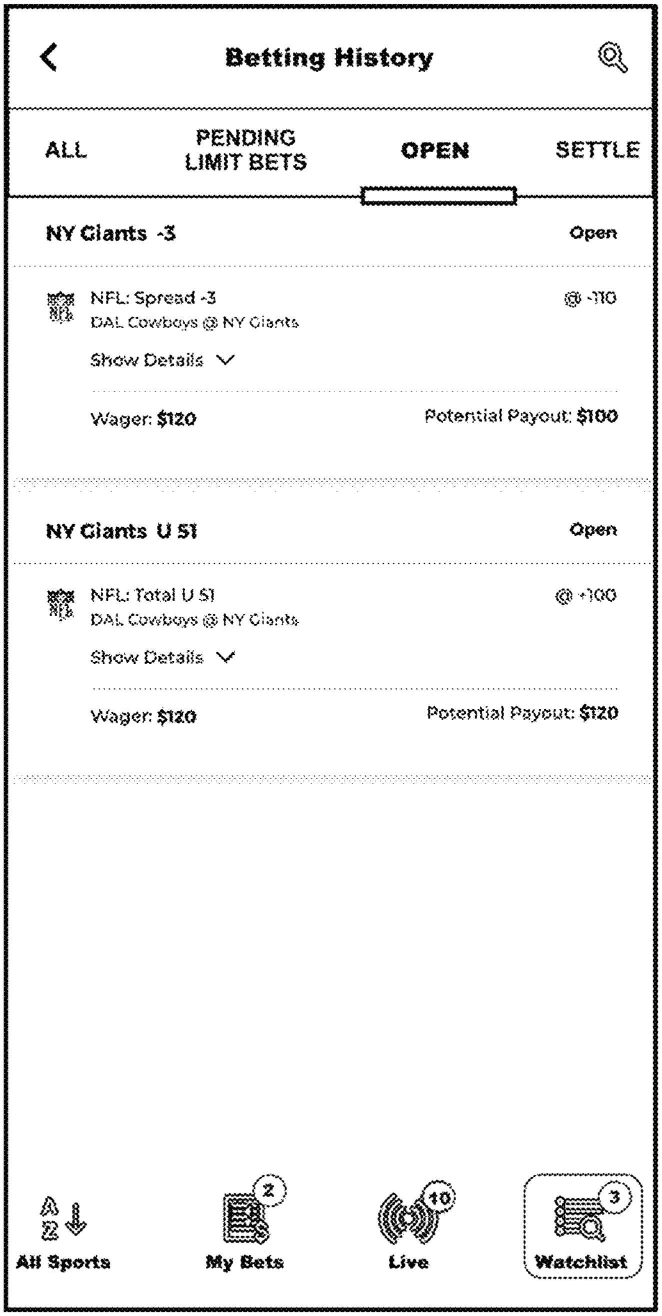

FIG. 18S is an example of the user interface of the present invention showing the bet in the open bets section since the criteria was met in the timeframe, showing the bet now as an open, active bet. As discussed herein, a series of alerts (via SMS, Email, direct messages, etc.) are generated according to applicant's invention so that a bettor may augment winnings and protect against or mitigate against losses, so that if an AI is used for betting management, a bettor may override that, or in the event only bettor betting instructions are used to control betting while bettor is not actively managing bets, an alert function can monitor the betting results and alert a bettor in the event that certain bettor defined thresholds are activated and surpassed. Once an alert threshold is crossed, a bettor may decide to alter the pre-defined betting strategy, so that bets may be changed or eliminated, or in some cases even expanded.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A method for a user to manage and take advantage of pre-game and live sports betting through a communication device connected with a betting platform comprising:

receiving, by at least one processor, a plurality of instructions enabling said user to define, in advance, one or more conditional betting criteria such that when said criteria are satisfied, a betting options has becomes activated to trigger a wagering action for said user, thereby eliminating time sensitive manual tracking and placement of bets, communicating via a plurality of proxy servers operating on a user device in a networked environment, with betting infrastructure to receive and process real-time betting data streams, wherein said real-time betting data streams are continuously analyzed for wager acceptance, risk calculations and compliance checks;

wherein said real-time betting data streams are continuously analyzed for wager acceptance, risk calculations, and compliance checks;

storing a wallet configured to execute a bet locally and on a cloud server, transferring an amount of money from a third-party banking database to said wallet, wherein said wallet is connected to said betting platform;

receiving betting limits input by said user, wherein said betting limits define at least one bet target and corresponding execution constraints;

inserting a widget configured to render said conditional betting criteria and corresponding limit bets blind to at least one sportsbook or live odds provider, wherein said widget is further configured to eliminate a risk of line manipulation advantageous to said at least one sportsbook;

storing said betting limits and conditional betting criteria in a database, wherein said database is continually refreshing and updating to match said betting limits against real-time odds data;

triggering an alert on said user device in response to predetermined parameters being satisfied;

monitoring live betting lines using said plurality of proxy servers during a sport event or pre-game wagering period such that said user is notified when said parameters for automatically placed bets using previously placed user bets are satisfied, wherein said predetermined parameters and previously stored conditional bets are evaluated against at least one sportsbooks betting line on a time-bounded basis to enable automatic triggering of new bets and an expiration of outdated independent of further user intervention;

receiving, at the at least one processor, instructions to identify a subset of betting content items associated with said conditional betting criteria;

generating a similarity profile for a betting content item;

computing a similarity score between said betting content item and a plurality of stored betting items; and displaying aggregated popular betting options based on said similarity score via a user interface.

2. The method according to claim 1 wherein a plurality of sports book application program interfaces are accessed by at least one of said plurality of proxy servers to enable said user to automate the process of placing bets and to enable a user to get the best pre-game or live odds for said at least one sportsbook.

3. The method according to claim 2 wherein historical bets of said user are stored in a historical database and enable said user to view which of said plurality of sports book application program interfaces is yielding certain results.

4. The method of claim 2 wherein an artificial intelligence program is employed to optimize betting for assessing at least one tagged aspect of a game established by said user and provide ratings using historical bets, for enabling multiple tagged aspects of games to be monitored, and matched.

5. The method of claim 4 wherein said artificial intelligence program is employed to optimize said at least one tagged aspect established by said user by comparing said plurality of sports book application program interfaces accessed by said user for placing said bets across multiple platforms, compare user results relating to said plurality of sports book application program interfaces and tag lines of interest said user wants to track and aggregating activity of said alerts triggered by predetermined parameter of user.

6. A system for a user to manage and take advantage of pre-game and live sports betting through a communication device connected to with a computerized betting platform, comprising:

at least one processor for receiving a plurality of instructions enabling a user to define, in advance, one or more conditional betting criteria such that when said criteria are satisfied a betting option becomes activated to trigger a wagering action for said user, thereby eliminating time sensitive manual tracking and placement of bets, a plurality of proxy servers for communicating and operating on a user device in a networked environment, with betting infrastructure to receive and process real-time betting data streams, wherein said real-time betting data streams are continuously analyzed for wager acceptance, risk calculations and compliance checks;

wherein said real-time betting data streams are continuously analyzed for wager acceptance, risk calculations, and compliance checks;

storing a wallet configured to execute a bet locally and on a cloud server, transferring an amount of money from a third-party banking database to said wallet, wherein said wallet is connected to said betting platform;

said computerized betting platform configured for receiving betting limits input by said user, wherein said betting limits define at least one bet target and corresponding execution constraints;

inserting a widget configured to render said conditional betting criteria and corresponding limit bets blind to at least one sportsbook or live odds provider, wherein said widget is further configured to eliminate a risk of line manipulation advantageous to said at least one sportsbook;

storing said betting limits and conditional betting criteria in a database, wherein said database is continually refreshing and updating to match said betting limits against real-time odds data;

triggering an alert on said user device in response to predetermined parameters being satisfied;

wherein said computerized platform monitors live betting lines using said plurality of proxy servers during a sport event or pre-game wagering period such that said user is notified when said parameters for automatically placed bets using previously placed user bets are satisfied, wherein said predetermined parameters and previously stored conditional bets are evaluated against at least one sportsbooks betting line on a time-bounded basis to enable automatic triggering of new bets and an expiration of outdated independent of further user intervention;

receiving, at the at least one processor, instructions to identify a subset of betting content items associated with said conditional betting criteria;

generating a similarity profile for a betting content item;

computing a similarity score between said betting content item and a plurality of stored betting items; and displaying aggregated popular betting options based on said similarity score via a user interface.

7. The system according to claim 6 wherein a plurality of sports book application program interfaces are accessed by at least one of said plurality of servers to enable said user to place bets on at least one sportsbook.

8. The system according to claim 7 wherein user-specific betting history is stored in a historical database and enable said user to view which of said plurality of sports book application program interfaces are yielding certain results.

9. The system of claim 8 wherein an artificial intelligence program is employed to optimize bet placement established by said user and provide ratings by utilizing a database of historical betting trends.

10. The system of claim 9 wherein said artificial intelligence program is employed to optimize bet placement and betting patterns established by said user by comparing said plurality of sports book application program interfaces accessed by said user for placing bets across multiple platforms, compare user results relating to said multiple platforms and tag lines of interest said user wants to track and aggregating activity of said alerts triggered by said historical bets.

11. A method for automated monitoring and execution of conditional betting logic in a sportsbook environment, comprising:

receiving, via at least one processor, user-defined conditional betting criteria including betting limits, timing constraints, and wagering parameters;

ingesting, via a distributed proxy-based architecture, multiple concurrent real-time betting data feeds from a plurality of sportsbook operators;

normalizing and synchronizing said real-time betting data feeds into a continuously updated internal state representation;

evaluating said conditional betting criteria against said internal state representation in an event-driven manner to determine when predefined conditions are satisfied, wherein concurrent evaluation of a plurality of user-defined conditional betting criteria is managed deterministically to preserve transaction ordering and state consistency;

performing wager acceptance, risk, and compliance checks prior to triggering a betting action or alert, wherein said wager acceptance, risk, and compliance checks are performed prior to satisfaction of said predefined conditions such that execution can occur immediately upon satisfaction of said predefined conditions;

triggering execution or alerting actions through a widget configured to abstract execution visibility from at least one sportsbook;

re-evaluating, in response to an unsuccessful execution attempt due to rejection, odds movement, or failure of wager acceptance, risk, or compliance checks, said user-defined conditional betting criteria against said continuously updated internal state representation, and re-applying a predetermined selection policy to initiate a subsequent execution attempt via the same or a different sportsbook application program interface of a different sportsbook operator within a remaining portion of a time-bounded evaluation window, or allowing the conditional betting criteria to expire;

expiring outdated conditional betting criteria based on time-bounded evaluation windows;

further comprising:

generating a similarity profile for a betting content item;

computing a similarity score between said betting content item and a plurality of stored betting items; and displaying aggregated popular betting options based on said similarity score via a user interface.

12. The method of claim 11 wherein an artificial intelligence algorithm is employed to optimize bet placement and betting patterns using said alert conditions aggregated upon said outcome of said bet and betting requisites established by said user.

13. The method of claim 12 wherein said artificial intelligence algorithm compares a plurality of sports book application program interfaces accessed by said user for placing said bets across multiple platforms and compares user results relating to said multiple platforms.

14. The method of claim 11 wherein said user is prompted to receive an alert on a limit bet application versus said bet automatically placed for live betting of various sports.

15. The method of claim 14 wherein a limit bet between said bets placed by said user and said bets automatically placed by said user is compared by an artificial intelligence algorithm to enable said users to assess advantageous betting patterns with respect to their local jurisdictions.

16. The method of claim 14 wherein alarms are set by said user to limit potential losses evaluated by a similarity score.

17. The method of claim 16 wherein a plurality of said alarms are informed by an artificial intelligence algorithm and are stored locally in a local memory unit of a communication device belonging to said user so as to inform said user of troublesome bets.

18. The method of claim 17 wherein said artificial intelligence algorithm is employed to optimize said bet placement and betting patterns established by said user by comparing a plurality of sports book application program interfaces accessed by said user for placing said bets across multiple platforms and comparing said results relating to multiple platforms.

* * * * *